US008335998B1

(12) United States Patent
Rubinger et al.

(10) Patent No.: US 8,335,998 B1
(45) Date of Patent: Dec. 18, 2012

(54) INTERACTIVE GLOBAL MAP

(75) Inventors: Bruce Rubinger, Newton, MA (US);
Vinh Do, West Roxbury, MA (US)

(73) Assignee: Global Prior Art, Inc., Boston, MA (US)

( * ) Notice: Subject to any disclaimer, the term of this patent is extended or adjusted under 35 U.S.C. 154(b) by 652 days.

(21) Appl. No.: 12/587,666

(22) Filed: Oct. 8, 2009

Related U.S. Application Data

(63) Continuation of application No. 11/648,034, filed on Dec. 29, 2006, now abandoned.

(51) Int. Cl.
*G06F 3/048* (2006.01)
(52) U.S. Cl. .......................... 715/855; 345/645
(58) Field of Classification Search ................... 715/762, 715/764, 853, 854, 855, 712, 771–773, 968; 707/706, 711, 736–740; 705/10, 36
See application file for complete search history.

(56) References Cited

U.S. PATENT DOCUMENTS

| | | | |
|---|---|---|---|
| 5,623,681 A | 4/1997 | Rivette et al. | |
| 5,642,502 A | 6/1997 | Driscoll | |
| 5,754,840 A | 5/1998 | Rivette et al. | |
| 5,799,325 A | 8/1998 | Rivette et al. | |
| 5,806,079 A | 9/1998 | Rivette et al. | |
| 5,809,318 A | 9/1998 | Rivette et al. | |
| 5,845,301 A | 12/1998 | Rivette et al. | |
| 5,848,409 A | 12/1998 | Ahn | |
| 5,991,751 A | 11/1999 | Rivette et al. | |
| 5,991,780 A | 11/1999 | Rivette et al. | |
| 6,038,561 A | 3/2000 | Snyder et al. | |
| 6,286,018 B1 | 9/2001 | Pitkow et al. | |
| 6,339,767 B1 | 1/2002 | Rivette et al. | |
| 6,499,026 B1 | 12/2002 | Rivette et al. | |
| 6,532,469 B1 * | 3/2003 | Feldman et al. | 707/750 |
| 6,604,114 B1 * | 8/2003 | Toong et al. | 1/1 |
| 6,662,178 B2 | 12/2003 | Lee | |
| 7,054,856 B2 | 5/2006 | Won et al. | |
| 7,117,198 B1 | 10/2006 | Cronin et al. | |
| 7,224,365 B1 * | 5/2007 | Seideman et al. | 345/473 |
| 7,750,910 B2 * | 7/2010 | Hild et al. | 345/440 |
| 8,161,025 B2 * | 4/2012 | Lundberg et al. | 707/706 |
| 2002/0054059 A1 * | 5/2002 | Schneiderman | 345/700 |
| 2006/0206264 A1 * | 9/2006 | Rasmussen | 701/212 |
| 2006/0224972 A1 * | 10/2006 | Albrecht et al. | 715/760 |
| 2006/0224983 A1 * | 10/2006 | Albrecht et al. | 715/764 |

(Continued)

OTHER PUBLICATIONS

Nuhn, D., "The Patent Market, Positioning your Product, Finding the Buyer," pp. 1-21.
Rubinger, B. and Davis, H., "Protecting IP Throughout the Product Lifecycle—Industry Can No Longer Afford an Intellectual Property Strategy that Relies on a Few Early-Stage Patents," Pharmaceutical Executive, pp. 40-48 (2003).

(Continued)

*Primary Examiner* — Steven Sax
(74) *Attorney, Agent, or Firm* — Hamilton, Brook, Smith & Reynolds, P.C.

(57) ABSTRACT

Systems and methods are provided for generating an interactive map for displaying and analyzing a compressive intellectual property landscape within a given field. Based on content analysis of relevant patents and patent applications, this prior art map provides a systematic review of vast quantities of data, thereby allowing the user to discern critical technology and product trends, prior art references, and the strategies of both leading and emerging competitors. Each patent represented on the map can be analyzed within the context of the prior art landscape to uncover novel features, strong claims, and business and technology trends. This comprehensive view can provide a foundation for creating effective corporate strategies in-tune with the realities of the intellectual property terrain.

21 Claims, 37 Drawing Sheets
(30 of 37 Drawing Sheet(s) Filed in Color)

U.S. PATENT DOCUMENTS

| | | | | |
|---|---|---|---|---|
| 2006/0224984 | A1* | 10/2006 | Albrecht et al. | 715/764 |
| 2006/0225000 | A1* | 10/2006 | Albrecht et al. | 715/853 |
| 2007/0226082 | A1* | 9/2007 | Leal | 705/27 |
| 2008/0068401 | A1* | 3/2008 | Albrecht et al. | 345/645 |
| 2008/0109159 | A1* | 5/2008 | Shi et al. | 701/208 |
| 2008/0134060 | A1* | 6/2008 | Albrecht et al. | 715/762 |
| 2012/0239535 | A1* | 9/2012 | Leal | 705/26.64 |

OTHER PUBLICATIONS

Pettersson, A., "Session IV: Identifying Opportunities & Trends in Key Strategic Areas—The IP Landscape Covering Drug Delivery via Pulmonary Drug Delivery," Best Practice Forum 1999.

Aurigin Systems product slides. 1998.

* cited by examiner

FIG. 2

Sample Data file

"US4809160","US","10/28/1985","10/28/1985","2/28/1989","Privilege level checking instruction for implementing a secure hierarchical computer system","Mahon; Michael J.|Baum; Allen|Bryg; William R.|Miller; Terrence C.","Hewlett-Packard Company","A low overhead way for insuring that only routines of sufficient privilege can execute on a secured page of memory in an hierarchial computer system, and for raising the privilege level of a low privilege process in an orderly and secure way is presented. This is done through the execution of a single ""gateway"" branch instruction standing between a procedure call by a lower privileged routine, such as a user program, and an operating system itself."

FIG. 7A

Sample Layout file
PATENTNUMBER
PRIORITYCOUNTRY                                   702
PRIORITYDATE
APPLICATIONDATE
PUBLICATIONDATE
TITLE
INVENTORNAME
ASSIGNEEAPPLICANTNAME
ABSTRACT
SUMMARY
BRANCHNUMBER
ATTR_1_Parametric_Response_1central_mgmt
ATTR_2_Parametric_Response_2various_levels
ATTR_3_Parametric_Response_3ordered_levels
ATTR_4_Parametric_Response_4auto_trigger
ATTR_5_Parametric_Response_5manual_trigger
ATTR_6_File_Tracking_1triggered_DirtyOP
ATTR_7_File_Tracking_2record_AC_hashes
ATTR_8_File_Tracking_3central_validatedMI
ATTR_9_File_Tracking_4new_files_xfer_to_center
ATTR_10_File_Tracking_5globally_prop_MI
ATTR_11_File_Tracking_6local_file_track
ATTR_12_File_Tracking_7central_track_localMI
ATTR_13_File_Tracking_8hierarchical_cache_MIchange
ATTR_14_File_Finder_1central_MI_ranges
ATTR_15_File_Finder_2distributed_MI_query
ATTR_16_File_Finder_3centrally_merged_results
ATTR_17_File_Analysis_01time_triggered
ATTR_18_File_Analysis_02central_stored_recent_files
ATTR_19_File_Analysis_03analyses_autochange_MI
ATTR_20_File_Analysis_04analyses_autotrigger_alarm
ATTR_21_File_Analysis_05analyses_autotrigger_analyses
ATTR_22_File_Analysis_06sig_equals_multi_hashes
ATTR_23_File_Analysis_07sign_only_AC
ATTR_24_File_Analysis_08group_files_in_webUI
ATTR_25_File_Analysis_09send_analysis_Bit9
ATTR_26_File_Analysis_10send_policy_Bit9
ATTR_27_File_Analysis_11AV_scan
ATTR_28_File_Analysis_12spyware_scan
ATTR_29_File_Analysis_13fwd_to_network_service

| ATRIBUTENAME | ATRIBUTECOLUMNNAME | ATRIBUTEMAPSHORTDESC | ISMAPDISPLAY |
|---|---|---|---|
| Parametric_Response_1c | ATTR_1 | A1 | Y |
| Parametric_Response_2b | ATTR_2 | A2 | Y |
| Parametric_Response_3o | ATTR_3 | A3 | Y |
| Parametric_Response_4a | ATTR_4 | A4 | Y |
| Parametric_Response_5n | ATTR_5 | A5 | Y |
| File_Tracking_1triggered_1 | ATTR_6 | A6 | Y |
| File_Tracking_2record_AC | ATTR_7 | A7 | Y |
| File_Tracking_3central_va | ATTR_8 | A8 | Y |
| File_Tracking_4new_files | ATTR_9 | A9 | Y |
| File_Tracking_5globally_p | ATTR_10 | A10 | Y |
| File_Tracking_6local_file | ATTR_11 | A11 | Y |
| File_Tracking_7central_tr | ATTR_12 | A12 | Y |
| File_Tracking_8hierarchical | ATTR_13 | A13 | Y |
| File_Finder_1central_MI | ATTR_14 | A14 | Y |
| File_Finder_2distributed_1 | ATTR_15 | A15 | Y |
| File_Finder_3centrally_me | ATTR_16 | A16 | Y |

Map Templates

- attributeidtemplate.vim
- branchinfooyaxis.vim
- countryidtemplate.vim
- gblmap.properties
- gia-config.xml
- gia-rules.xml
- headertemplate.vim
- navbranchinfoyaxis.vim
- navheadertemplate.vim
- navpatentinfo.vim
- navtrailertemplate.vim
- navyearinfoxaxis.vim
- patentinfo.vim
- trailertemplate.vim
- velocity.properties
- yearinfoxaxis.vim

UI Chart Structure

INTERACTIVE GLOBAL MAP

RELATED APPLICATION

This application is a continuation of U.S. application Ser. No. 11/648,034, filed Dec. 29, 2006 now abandoned. The entire teachings of the above application are incorporated herein by reference.

BACKGROUND OF THE INVENTION

As the amount of prior art information continues to grow rapidly, the number of users who are new to the field of prior art searching also continues to grow. To assist users in identifying prior art, there are information gathering and retrieval tools and services. Users are likely to navigate patent and technical publication databases to search for relevant prior art. However, without assistance from a service that provides prior art search experts, a user is unlikely to find relevant prior art quickly and efficiently.

Increasingly, prior art information gathering and retrieval services are faced with a market full of users who want to be able to search for very specific prior art information, as quickly as possible, and without being burdened with false positives. Unfortunately, the currently available prior art searching technologies do not provide a user-friendly, comprehensive and versatile solution.

SUMMARY OF THE INVENTION

In today's dynamic global environment, effective intellectual property management can mean the difference between success and failure for a new product or even a company. Companies want to be able to easily evaluate and generate a comprehensive assessment of their products, technologies and intellectual property assets in the context of the prior art landscape. These users want specific prior art information that is directed to a particular type of technology and to specific companies developing that technology. Although there are prior art searching tools, they do not enable users to easily conduct effective and efficient due diligence, infringement studies, patentability searches, and freedom-to-operate studies. Thus, the current prior art information gathering and retrieval schemes are unable to provide efficiently a user with such targeted information.

The present invention relates generally to an interactive map depicting the prior art landscape. The interactive map is an effective tool for displaying and analyzing the complete intellectual property landscape within a given field. Based on content analysis of relevant patents and patent applications, the interactive map can provide a systematic review of vast quantities of data, thereby allowing the user to discern critical technology and product trends, prior art references, and the strategies of both leading and emerging competitors. In order to develop an accurate picture of the intellectual property landscape, key product features and attributes can be selected for use in analyzing the prior art documents. This yields a consistent set of information that allows further analysis. Each patent can be analyzed within the context of the prior art landscape to uncover novel features, strong claims, and business and technology trends. The maps can support visualization of major features of the landscape and provide an accurate, comprehensive picture of the intellectual property landscape. This comprehensive view can provide a foundation for creating effective corporate strategies in-tune with the realities of the intellectual property terrain.

According to an embodiment of the present invention, a computer implemented method for analyzing prior art is provided. Features of interest from a collection of prior art documents are stored. The features of interest can be stored in a database. The features of interest include technical features and dates associated with the prior art documents. The features of interest can be determined using artificial intelligence or rules based systems. An interactive map is generated that reflects the prior art features of interest. Visual indicators that represent at least a portion of the prior art documents are distributed onto the interactive map. The prior art document indicators are distributed on the interactive map based on the technical features and the dates associated with the prior art documents.

Prior art documents can be arranged on the interactive map by technical features into branches (y-axis on map) and by dates (x-axis on map). The dates used to arrange the prior art documents on the interactive map may include any of the following: a patent application filing date, a patent application publication date, a patent application priority date, and a document publication date. The prior art documents displayed on the interactive map may include patents, applications, journal articles or technical papers.

A navigation tool may be provided to enable the user to navigate the interactive map. Bibliographic information about a prior art document is displayed on the interactive map when a user hovers a mouse cursor over that prior art document's indicator represented on the map. The bibliographic information can includes any of patent number, priority date, priority country, application date, publication date, title, assignee, inventor, figure/abstract, and defined attributes.

A color schema for each country associated with prior art documents can be defined. The color schema can be used to generate a chart that compares information about the prior art documents for each country. The prior art documents for each country can be clustered on the chart by color.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1E illustrates an example of the interactive Global Map of FIG. 1A that has been generated showing only assignee attributes.

FIG. 2 illustrates an example window that a user may receive upon hovering the mouse over a particular patent within the Global Map display.

FIG. 7A illustrates an example data file.

FIG. 7B illustrates an example layout file.

FIG. 9 illustrates an example of an attribute management page.

FIG. 21D shows an example of the file structure for the map templates software package file structure.

DETAILED DESCRIPTION OF THE INVENTION

A description of example embodiments of the invention follows.

Interactive Global Map

Figure 1A:
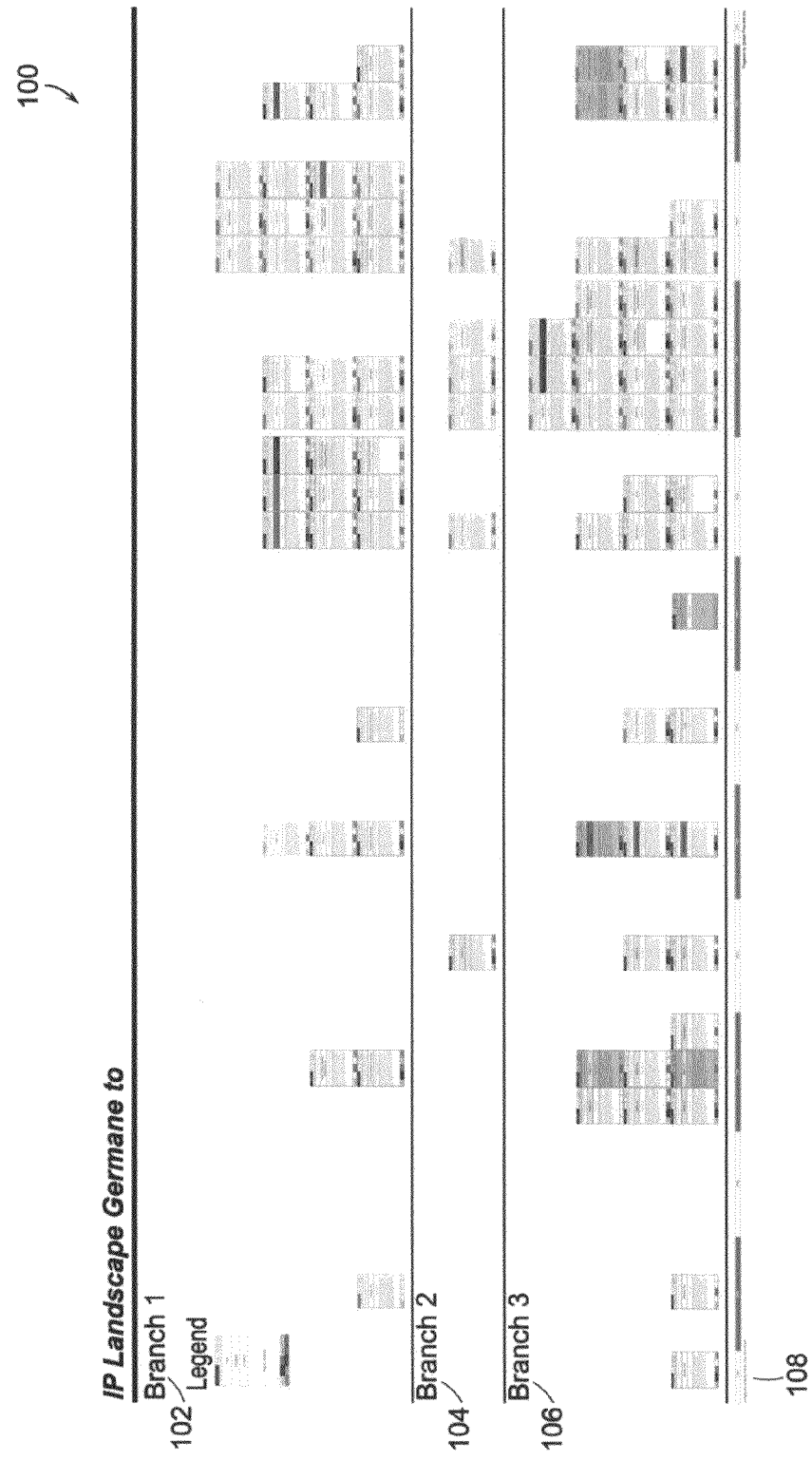
FIG. 1A illustrates an example of an interactive Global Map in accordance with an embodiment of the invention.

FIG. 1A is an example interactive "Global Map" 100 in accordance with an embodiment of the invention. The Global Map 100 is a patent map that provides an effective and efficient tool for displaying and analyzing the complete intellectual property landscape within a given technical field.

The methodology underlying the Global Map 100 is based on content analysis, in contrast with the majority of the current generation of patent analysis tools that rely on citation analysis. Citation analysis is more than fifteen years old and is based on the relationships among patents, as evidenced by the chain of cited references. It holds that patents, which cite a relevant patent, are relevant, and that patents which are often cited are "strong patents." In contrast, a body of evidence has surfaced over the last few years that suggests cited patents may often be non-relevant, and that the frequency of citation is more a reflection of whether the terms utilized in a patent are likely to be picked up in a keyword search.

Thus, in his presentation on "The Patent Market: Positioning Your Product, Finding the Buyer" at the 40th Annual Meeting of the Licensing Executives Society, Oct. 17-21, 2004, Mr. Derek Nuhn, SVP of Semiconductor Insights reported that the patents which yielded the highest licensing revenues often had few citations, and that there appeared to be no relationship between patent value as measured by licensing and the number of cited patents. Similar findings were reported in a study carried out by Global Prior Art for the International Copper Association in 2003. A panel of industry experts selected the most important patents from among 300+ documents on the landscape. Comparing the patents selected by the experts based on content against patents which had the most citations, several trends were apparent: 1) strong patents often had few citations; and 2) patents frequently cited did not disclose distinguishing technology, but were often cited in conjunction with many continuations. The above findings were reported in a briefing with the International Copper Association at the conclusion of this research project. Others have reported similar findings.

By using a content analysis of relevant patents, patent applications and other technical documents, the Global Map 100 provides a systematic review of vast quantities of data, thereby allowing the user to discern critical technology and product trends, prior art references, and the strategies of both leading and emerging competitors. For developing an accurate picture of the intellectual property landscape, key product features and attributes are selected for use in analyzing the patents. This yields a consistent set of information that allows further analysis. Each patent is analyzed within the context of the prior art landscape to uncover novel features, strong claims, and business and technology trends. The maps support visualization of major features of the landscape and provide an accurate, comprehensive picture of the intellectual property landscape. This comprehensive view provides a foundation for creating effective corporate strategies in-tune with the realities of the intellectual property terrain. The Global Map 100 can be used for a variety of purposes, including to help target research and development funds to novel and productive research, to assess freedom-to-operate strategies, to evaluate acquisition opportunities, to identify business opportunities, and create valuable IP portfolios.

The Global Map 100 allows the user to generate various types of charts based on the patent counts and/or portfolio distribution by assignees and the technology category associated with the patent (the "branch") 102, 104, 106. The charts can be generated on either patent's priority year or patent's application year.

To create a Global Map 100, all patents and applications relevant to a specific search focus are collected, analyzed within the context of prior art, and positioned on the map. Documents are arranged by technical features, into branches 102, 104, 106 (y-axis on map) and by priority dates 108 (x-axis on map). In addition to patents and applications, other documents, such as journal articles or technical papers, can also be put on the map.

Figure 1B:
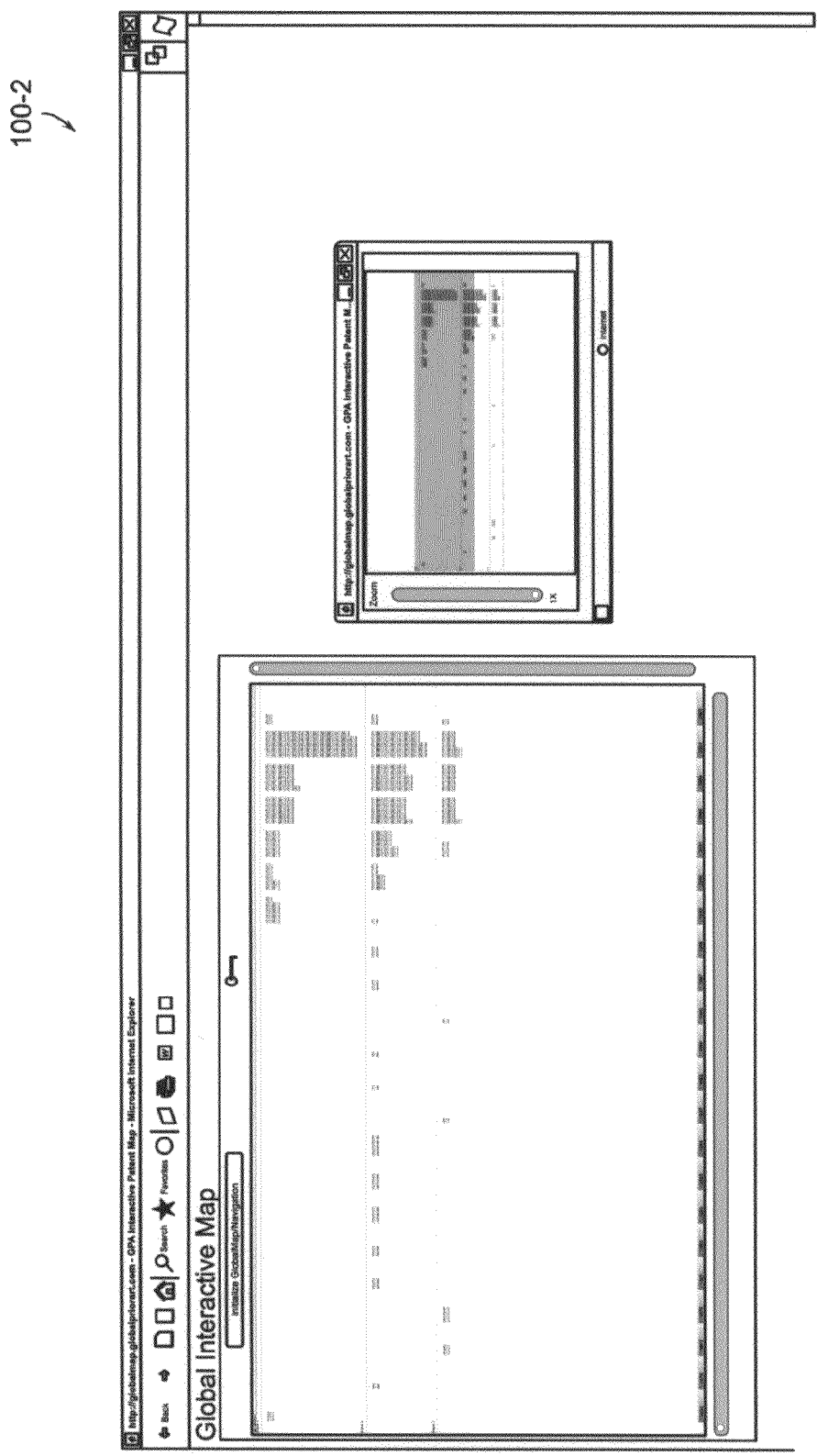
FIG. 1B illustrates an example of a zoomed out version of the interactive Global Map.

FIG. 1B is an example of a zoomed out version of the interactive Global Map 100-2. This screenshot shows how a zoomed-out version of the interactive Global Map 100-2 would appear on a user's screen, in a web browser.

Figure 1C:
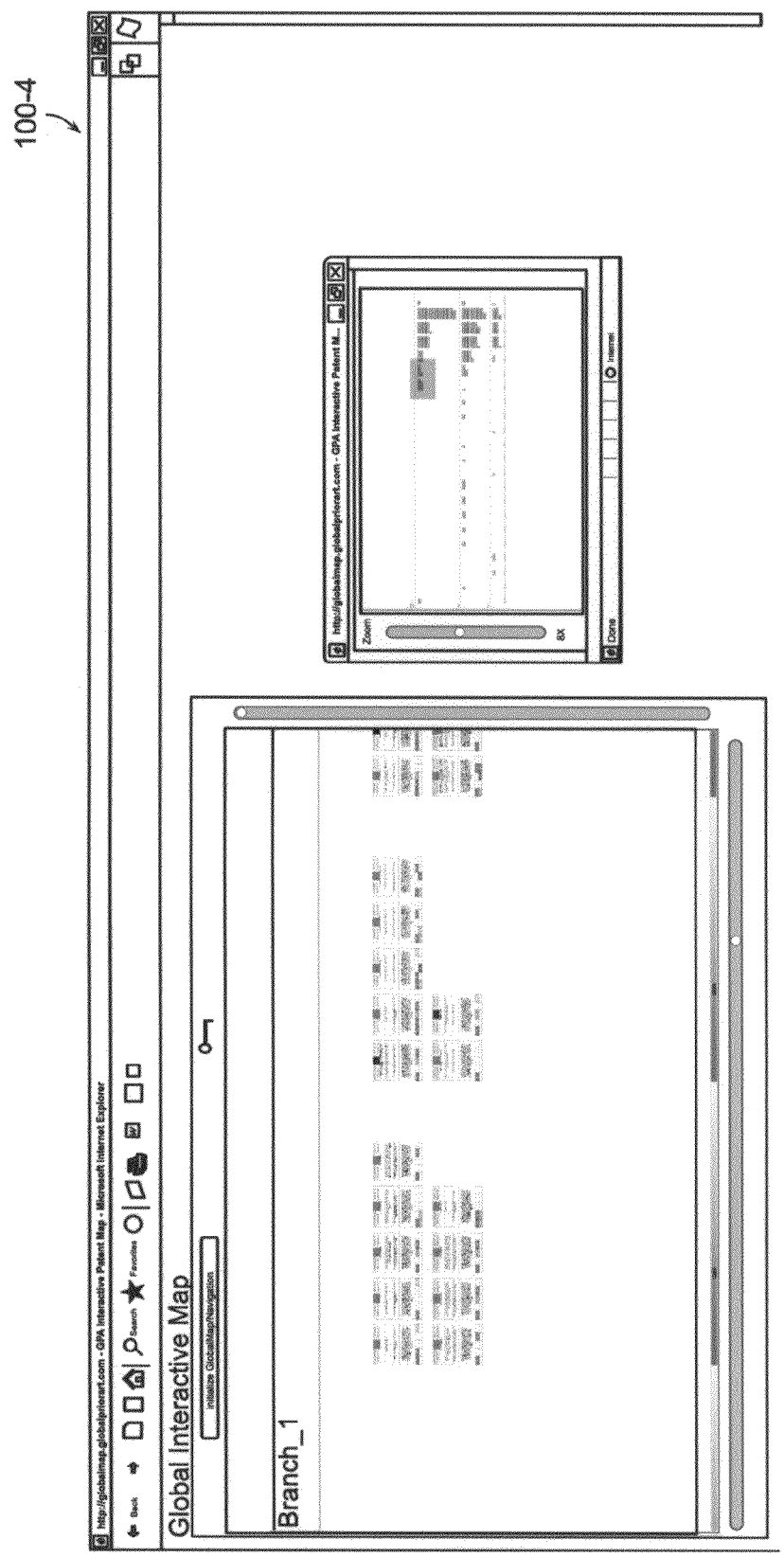
FIG. 1C illustrates an example of a zoomed in version of an interactive Global Map.
Figure 1D:
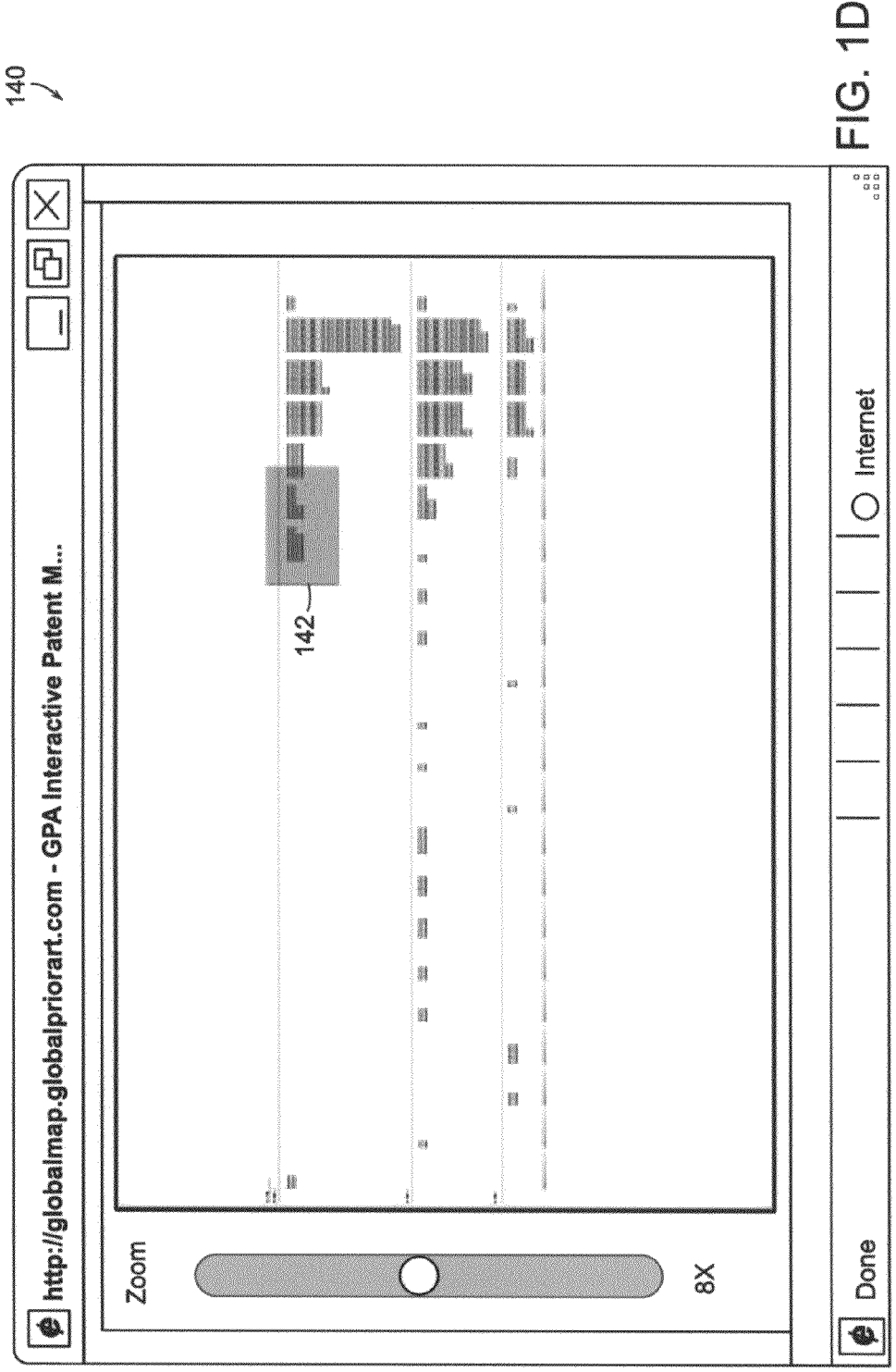
FIG. 1D illustrates an example of a navigation pop-up window.

FIG. 1C is an example of a screenshot of a zoomed in version of an interactive Global Map 100-4. This screenshot shows how a zoomed-in version of the interactive Global Map 100-4 would appear on a user's screen, in a web browser FIG. 1D is an example of a navigation pop-up window 140 that is used to navigate the interactive Global Map 100. The blue-gray rectangle 142 can be dragged with a mouse cursor to the section of the map which the user is interested in viewing (or zooming in on). The user is then taken to that section on the regular interactive Global map window 100.

Figure 1F:
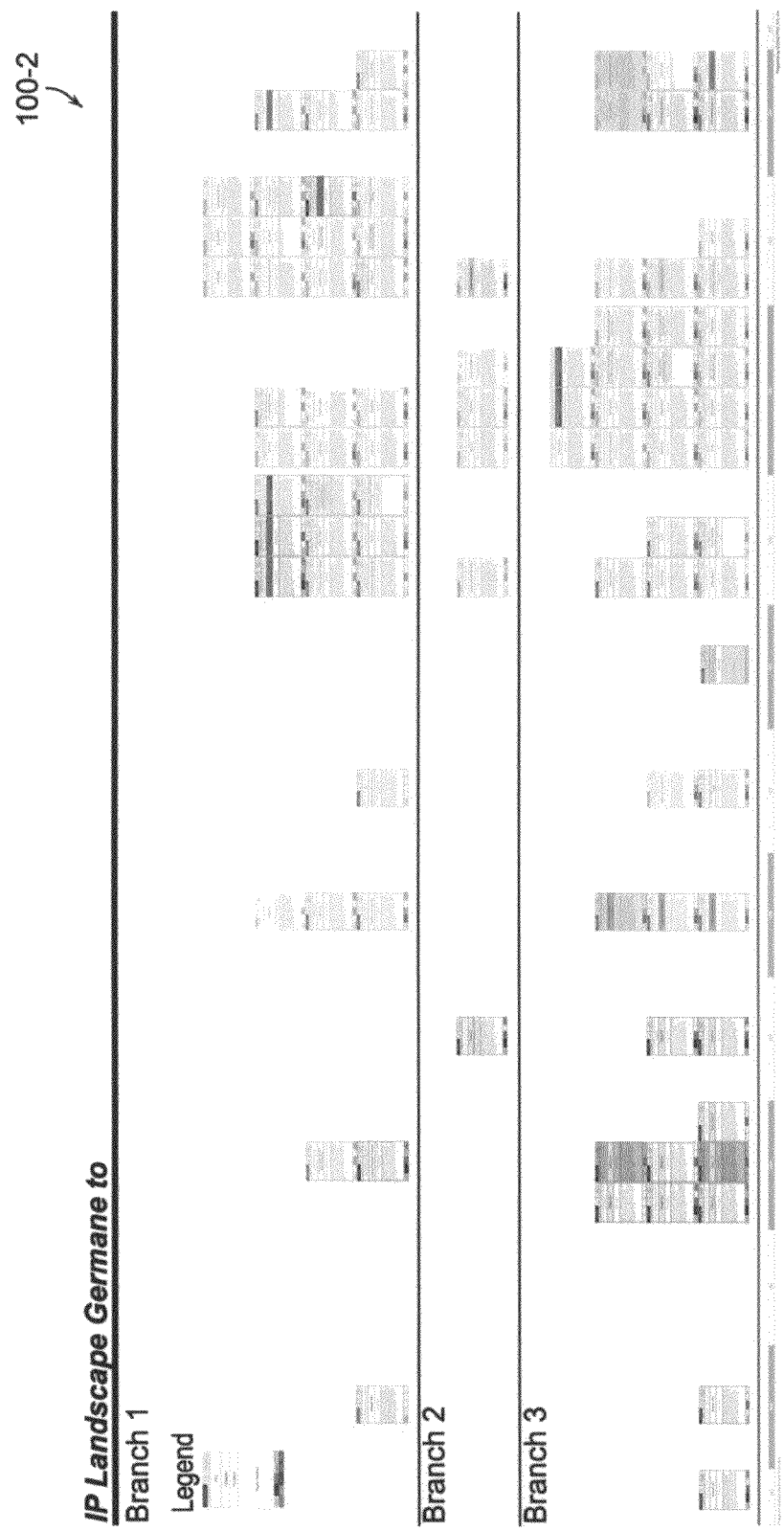
FIG. 1F illustrates an example of the interactive Global Map of FIG. 1E layered over the interactive Global Map of FIG. 1A.

It can be useful for a user to see different versions of a patent map in the context of a full landscape. For example, if the user generates an entire Global Map 100 (showing all the assignees, attributes, etc.), but then wants to see specifically where the user's corporation or its competitors are in the context of the full map 100, the user would first generate the full map 100 as shown in FIG. 1A. Then, the user would generate another map 100-1 shown in FIG. 1E, detailing specific attributes of interest. In FIG. 1E, the specific attribute of interest is assignee. In particular, the interactive Global Map 100-1 has been generated showing only assignee attributes. The user has the ability to request that a map be generated focusing on any attribute or feature of interest. FIG. 1F illustrates an example of the interactive Global Map of FIG. 1E layered over the interactive Global Map of FIG. 1A. By layering 100-2 the Global Map 100-1 over Global Map 100, and graying out Global Map 100, the user can easily view the areas of interest. This can be even more apparent if the user toggles between Global Map 100-1 and Global Map 100-2.

Figure 2:
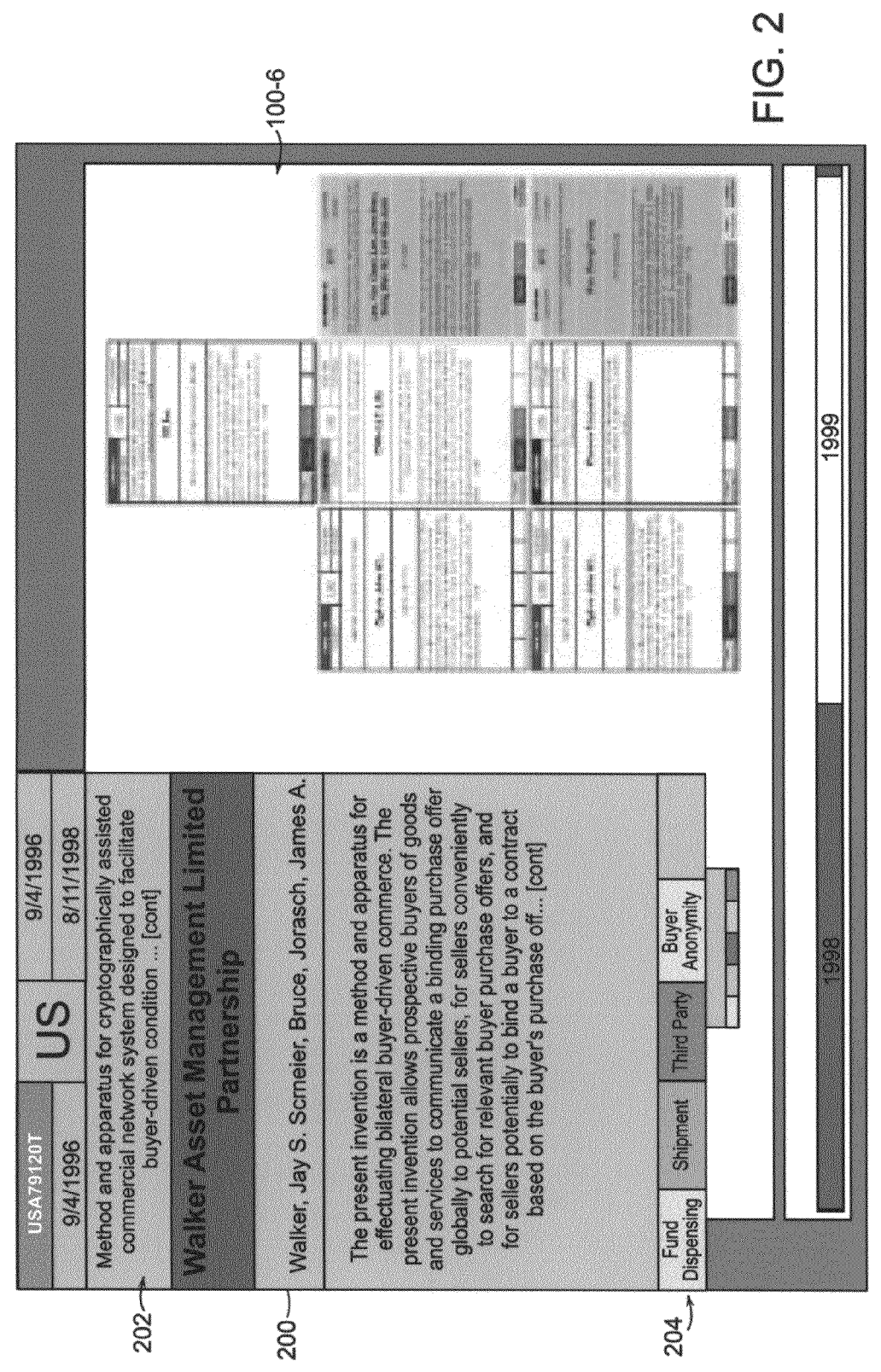

FIG. 2 illustrates the display that a user may receive upon hovering the mouse over a particular patent 200 within the Global Map 100-6 display. The map label feature includes bibliographic information 202 for the patent 200 as well as color-coded attribute boxes 204. If the particular patent 200 is selected, then a PDF of the patent is provided.

Figure 3:
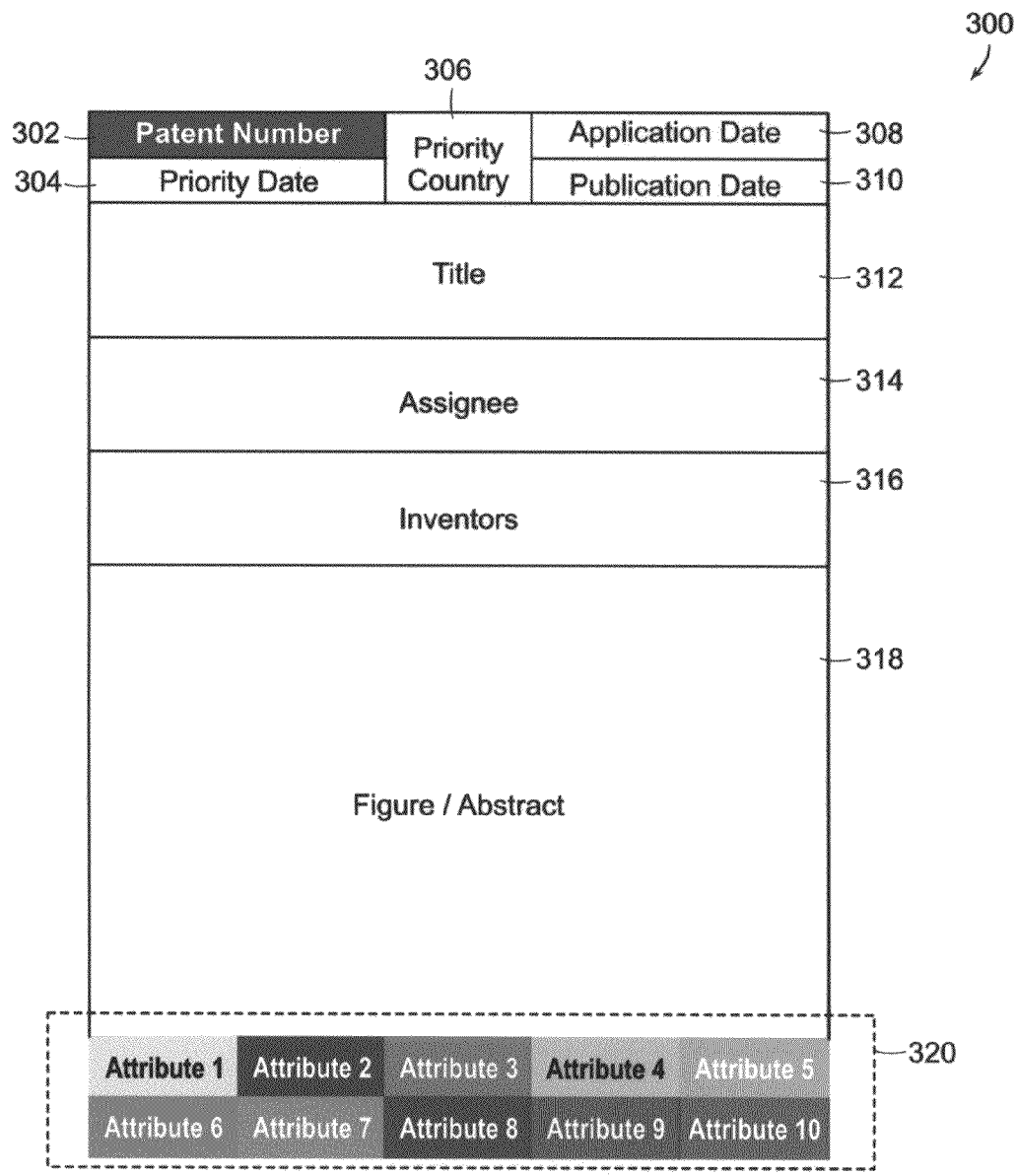
FIG. 3 illustrates the type of information that can be displayed for each patent within the Global Map system.

FIG. 3 illustrates the information 300 that can be displayed for each patent within the Global Map system 100. The information 300 includes the following: patent number 302, priority date 304, priority country 306, application date 308, publication date 310, title 312, assignee 314, inventors 316, figure/abstract 318, and attributes one through ten 320.

Creating the Interactive Global Map

The invention provides a web-based Internet application that allows users to generate the interactive global map (patent maps) and charts based on various patent criteria. The application could be accessible through an Internet Explorer browser (6.0+) and may be used in conjunction with Adobe SVG plug-in and Java plug-in for viewing generated maps and charts. The plug-ins are installed automatically when the user tries to view the map or chart for the first time. The user initializes the data attributes, branch, assignees, and patent information before generating maps/charts.

Figure 4:
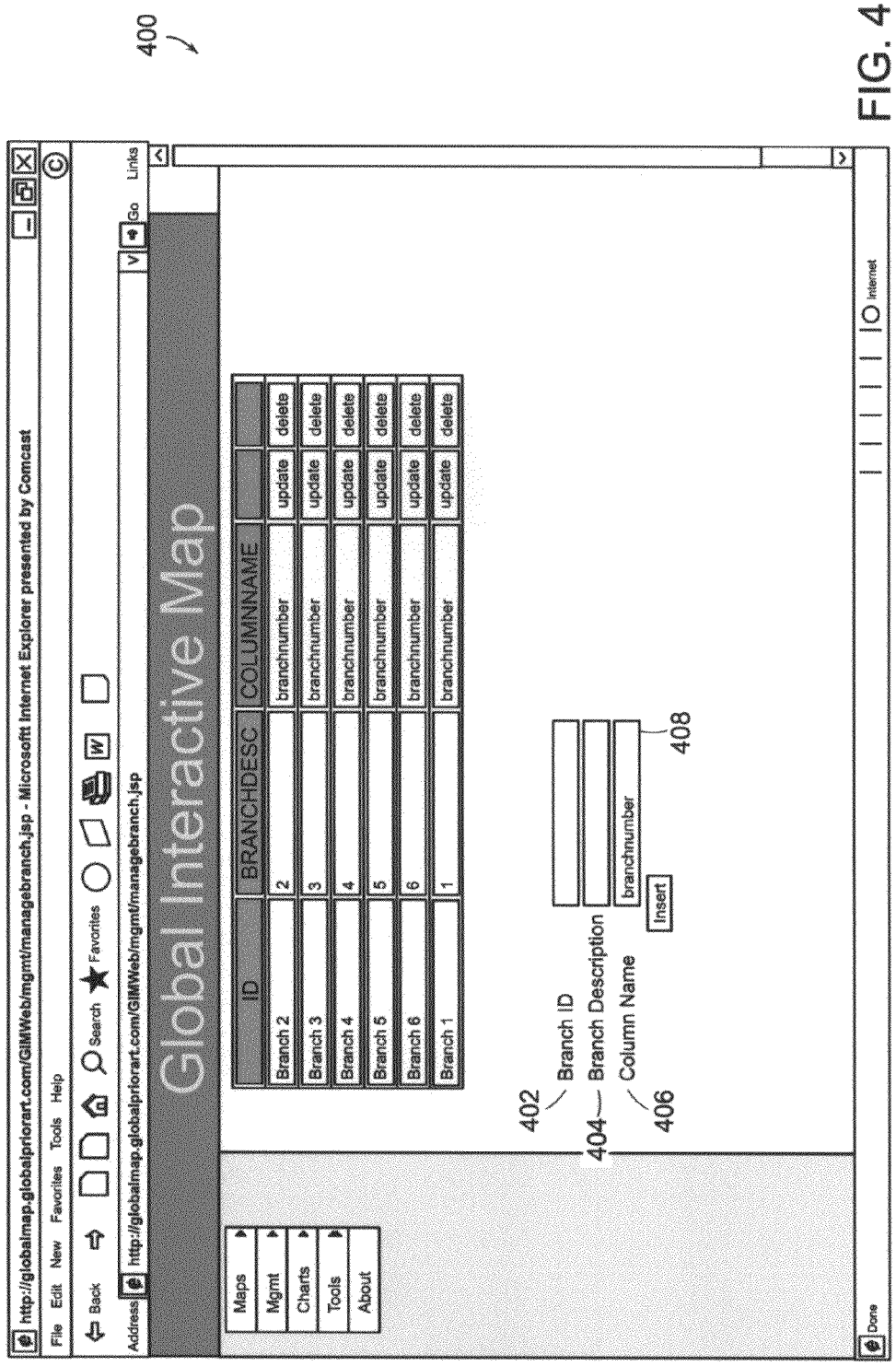
FIG. 4 illustrates an example page that may be used to set up branch information for the patent data.

FIG. 4 is an example of a page 400 that may be used to set up branch information for the patent data. The user can enter in the ID 402 and BranchDesc Information 404. The Column-Name 406 can be defaulted to the branchnumber 408, which is a field name located in the layout file. The ID 402 refers to the label that appears on the generated map 100 and Branch-Desc 404 refers to the number corresponding to the patent's branch number, which should correspond to the integer value specified for branchnumber 408 in the input data file.

Figure 5:
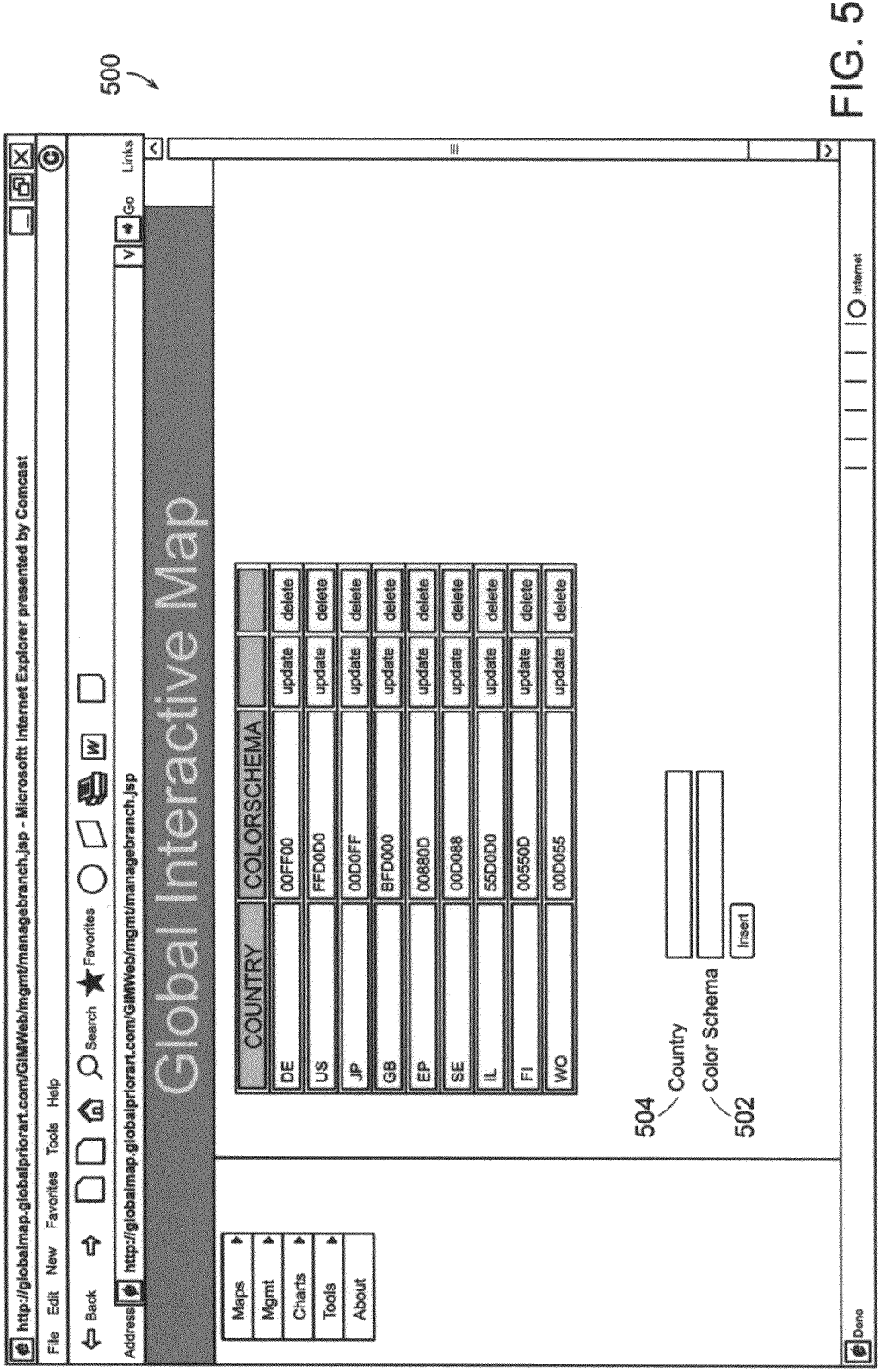
FIG. 5 illustrates an example page that enables the user to map various country codes to different color schema.

FIG. 5 is an example of a page 500 that enables the user to map various country codes to different color schema. To do so, the user could type in the hexadecimal color codes 502. The country value 504 is a two letter code which is specified in the data file.

Figure 6:
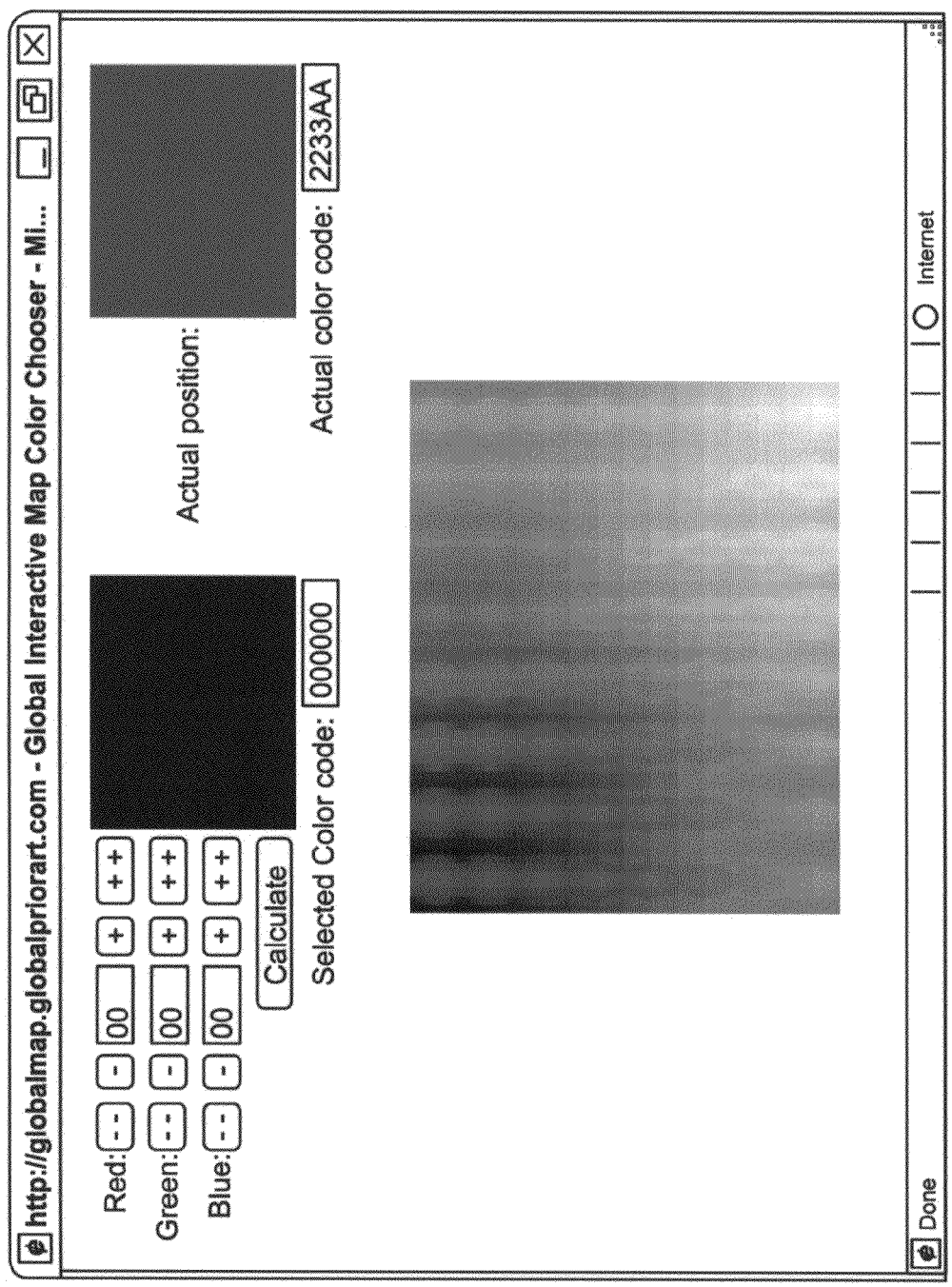
FIG. 6 illustrates an example color chooser.

FIG. 6 is a screenshot of an example color chooser 600. The color chooser 600 is available by selecting tools 510 and then color chooser from the left navigation menu in FIG. 5 to help the user in obtaining the hex color code. The color chooser screen generates the hex color code for the chosen color on the screen, which can be copied or pasted into the color schema field 502 of FIG. 5.

Figure 7C:
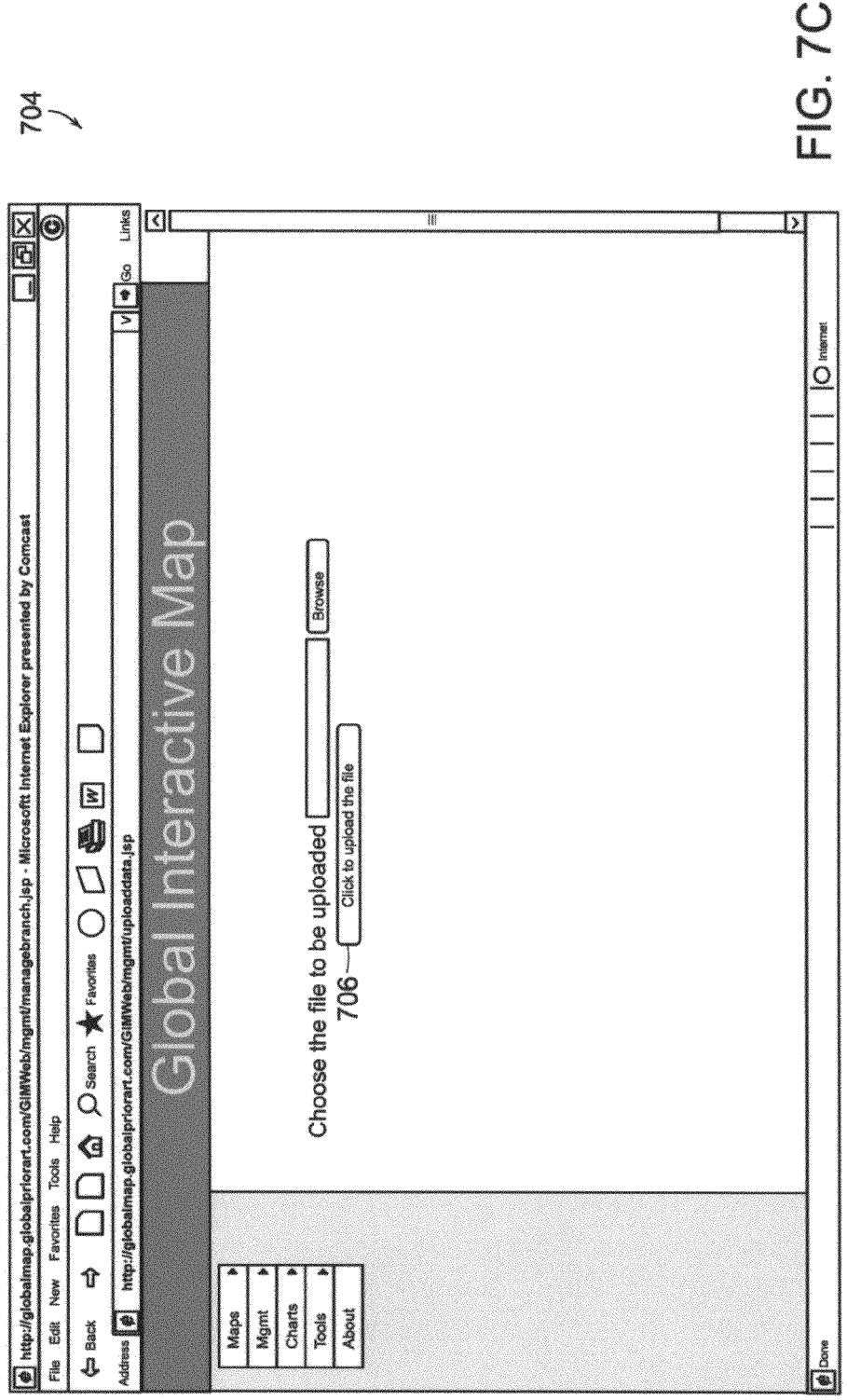
FIG. 7C illustrates an example of an upload page.

Next, the user enters the static data prior to generating patent maps. The static data is usually the comma-separated value text export from the database. Using the upload screen, the user uploads two files: (1) the data file (comma-separated value export) and (2) the layout file, which defines how columns are laid out. An example data file 700 is provided is shown in FIG. 7A, and an example layout file 702 is provided in FIG. 7B. FIG. 7C is an example of a page 704 in which the user would select the local file in the input box and click on upload button to upload each file. The layout file 702 should not contain any blank rows at the top. The first thirteen lines specify the following patent fields:

PATENTNUMBER
PRIORITYCOUNTRY
PRIORITYDATE
APPLICATIONDATE
PUBLICATIONDATE
TITLE
INVENTORNAME
ASSIGNEEAPPLICANTNAME
SUMMARY
BRANCHNUMBER

Line 14 onwards specifies the individual attributes. Every attribute is specified in a separate line. Every attribute line entry implies both "claimed" and "taught" attributes.

Figure 8:
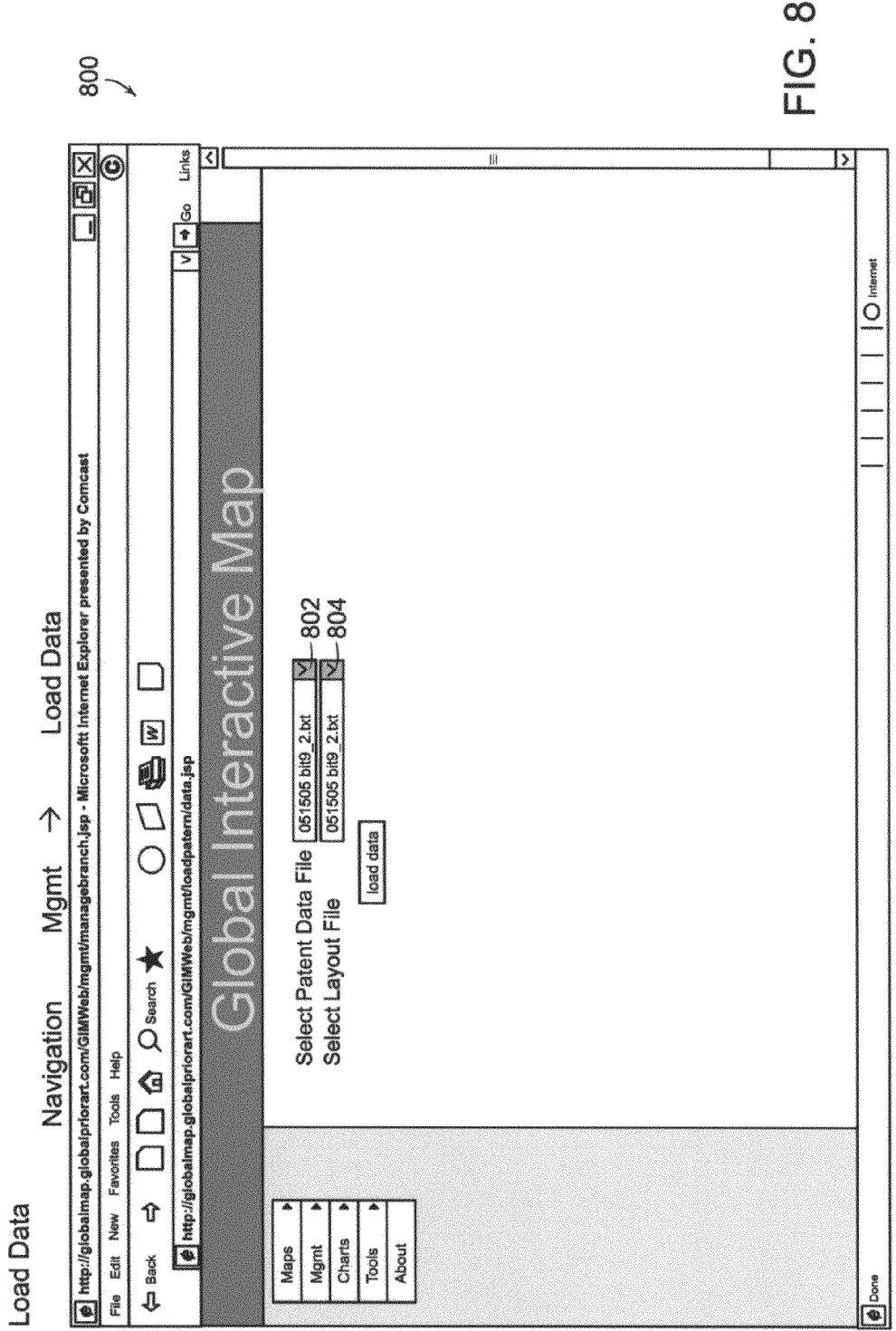
FIG. 8 illustrates an example of a load patent and layout data page.

Once the files are uploaded 806 onto the server, the user can initiate a data load by choosing the patent data 802 and layout files 804 on the Load Data screen, which is illustrated by FIG. 8. First, the system will read the layout file 702 and create all mappings within the web server's database ("patentinfoattribute" table). The system then reads the comma-separated value file 700 based on the layout file and loads the data into the database ("patentinfo" table).

The screen will display the number of records inserted. Preferably, the user validates this against the expected number from the data file 700. In case of missing records, the user can ensure that: (1) the data file 700 has the correct number of attributes as per the layout file 702, (2) all fields are enclosed in double quotes, and (3) all fields are separated by commas.

Once the data is loaded, the user can navigate to Attribute Mappings screen 900 to validate the attribute mappings, as illustrated by FIG. 9. The Attribute Mappings 900 screen also allows the user to make any changes. Once the layout file 702 is loaded into the system, the user can validate the attribute information using the screen 900 illustrated by FIG. 9. This screen 900 also allows the user to make any modifications to the "attribute names," "colors, "attribute display name" on the map 100. The map 100 can display up to ten attributes in a label.

Figure 10:
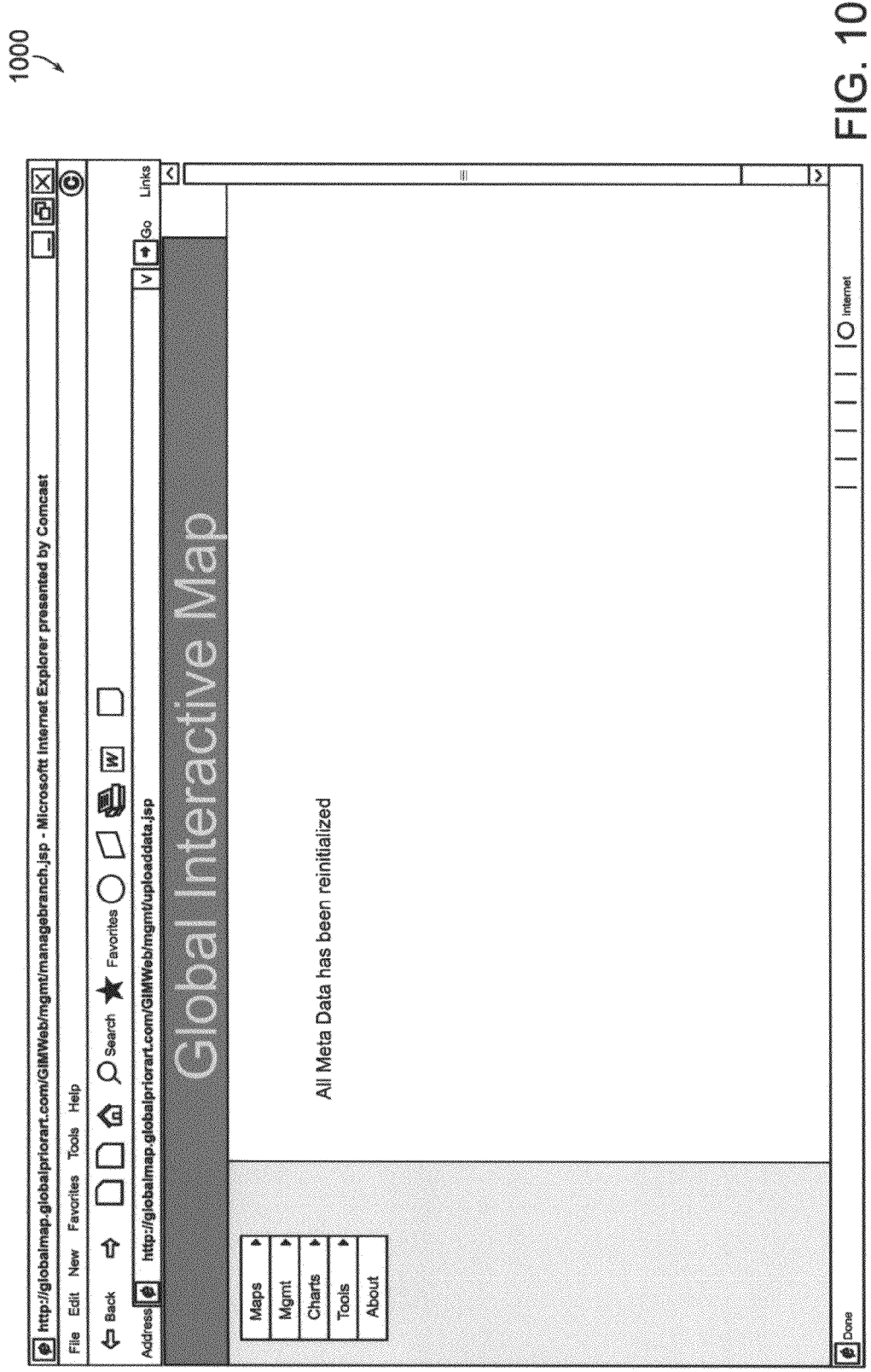
FIG. 10 illustrates an example of a page indicating that the data has been reinitialized.

The user navigates to the screen 1000 illustrated by FIG. 10 to synchronize the map generation server with all the loaded data prior to generating any map.

Figure 11:
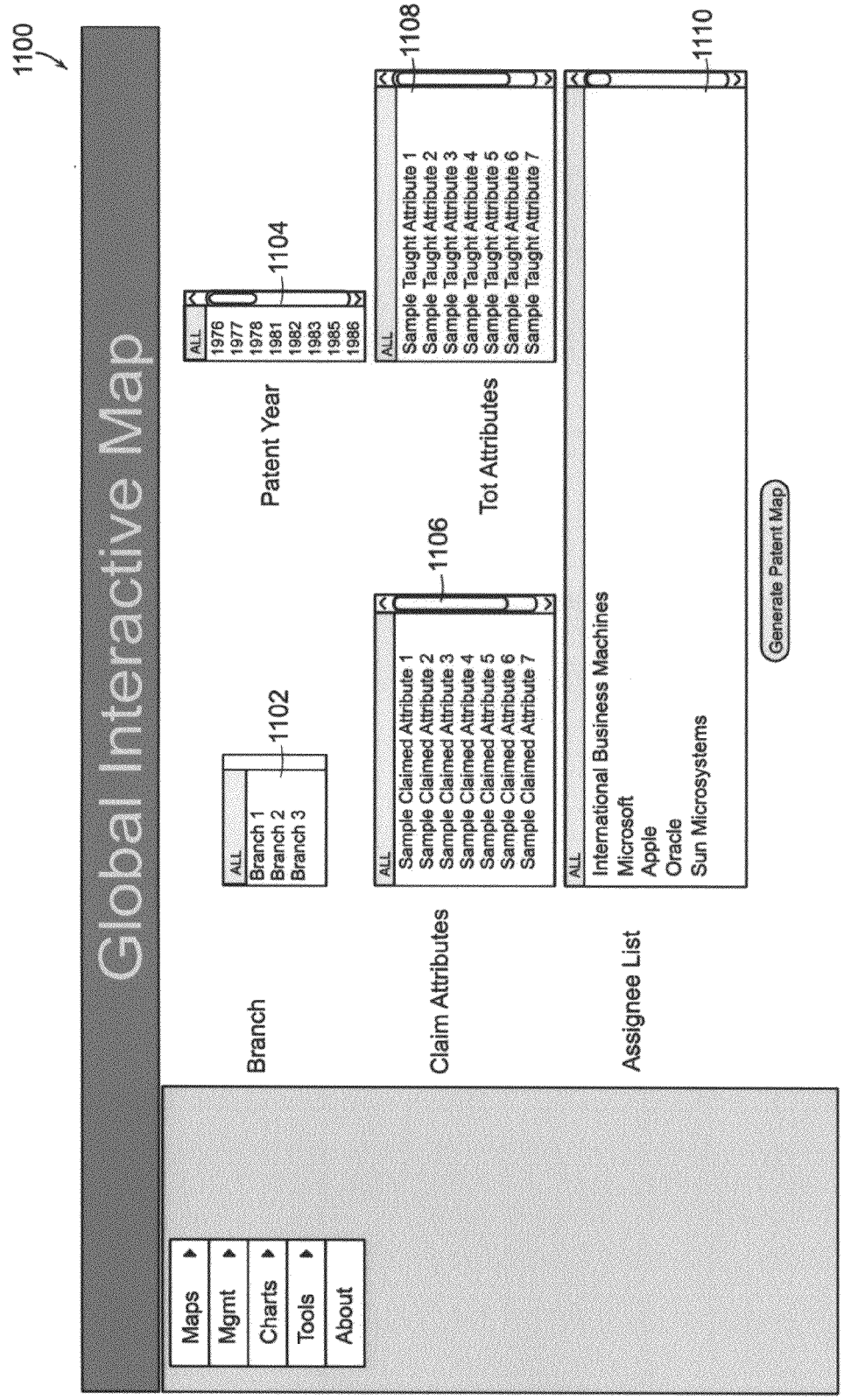
FIG. 11 illustrates an example of a map generation screen.

The system supports map generation based on the patent filing year, as illustrated by the screen 1100 in FIG. 11. The user has the option to choose one or any combination of selection criteria, which is the branch 1102, patent (filing) year 1104, claimed 1106 and taught attributes 1108, and assignee information 1110. All criteria are set to "ALL" by default. Upon selecting the Generate button 1112, the user is prompted to enter a map name. Based on the user selection criteria, the map is generated on the server with the name entered by the user. The user is taken to a new screen which indicates the successful generation of the map.

Figure 12:
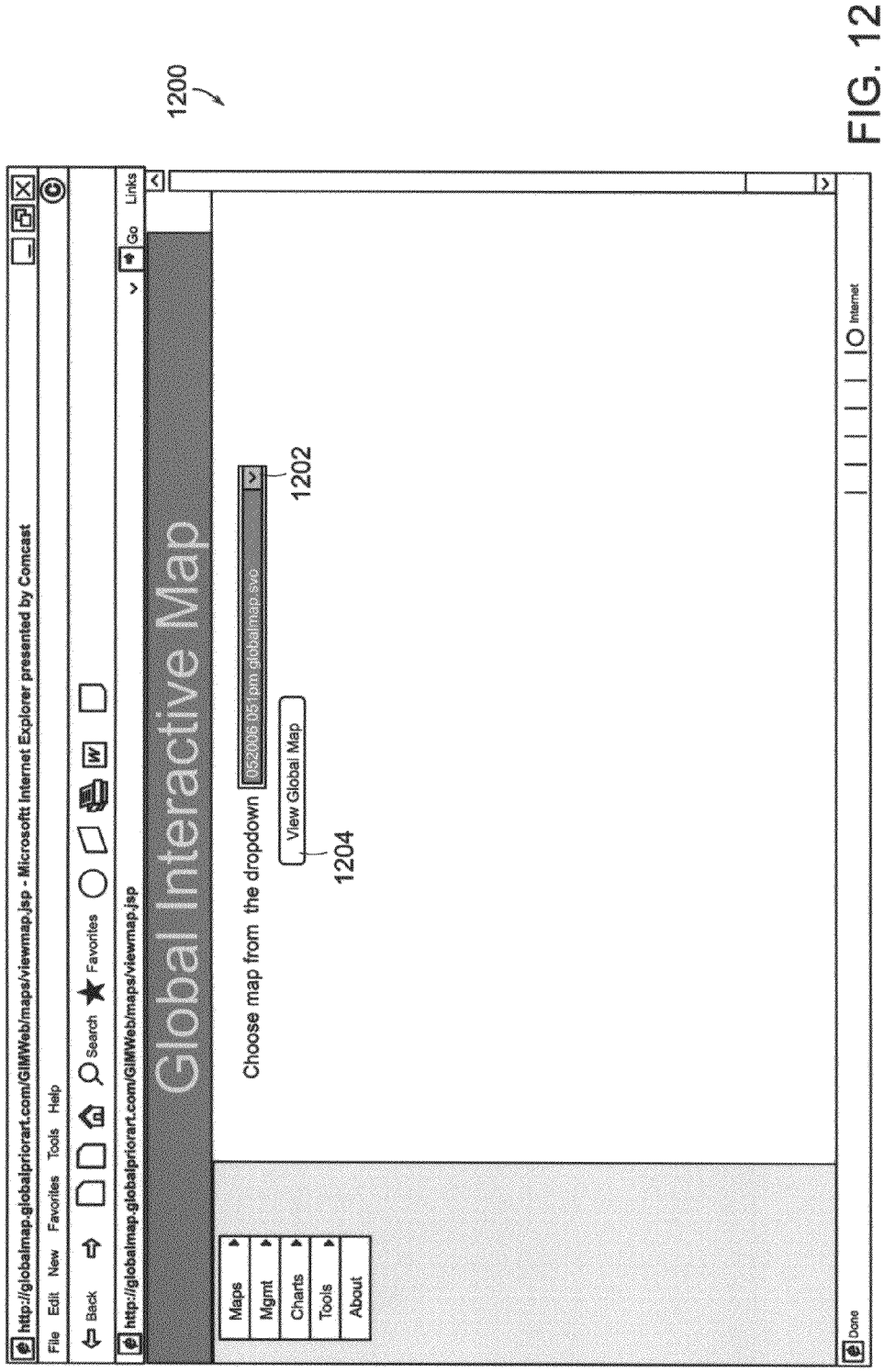
FIG. 12 illustrates an example of a page enabling to view the global map.
Figure 13A:
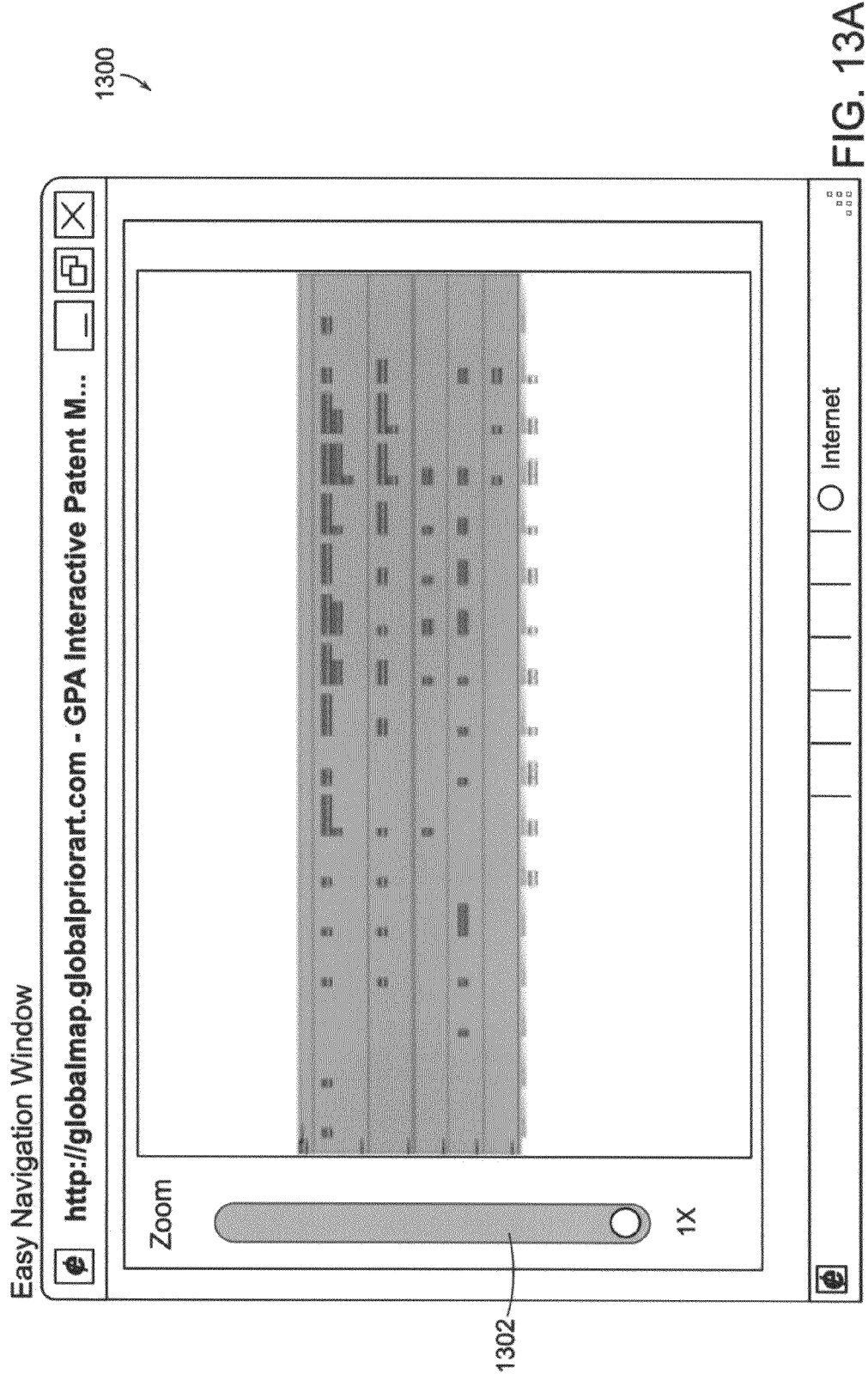
FIG. 13A illustrates an example of a small map navigation viewer.
Figure 13B:
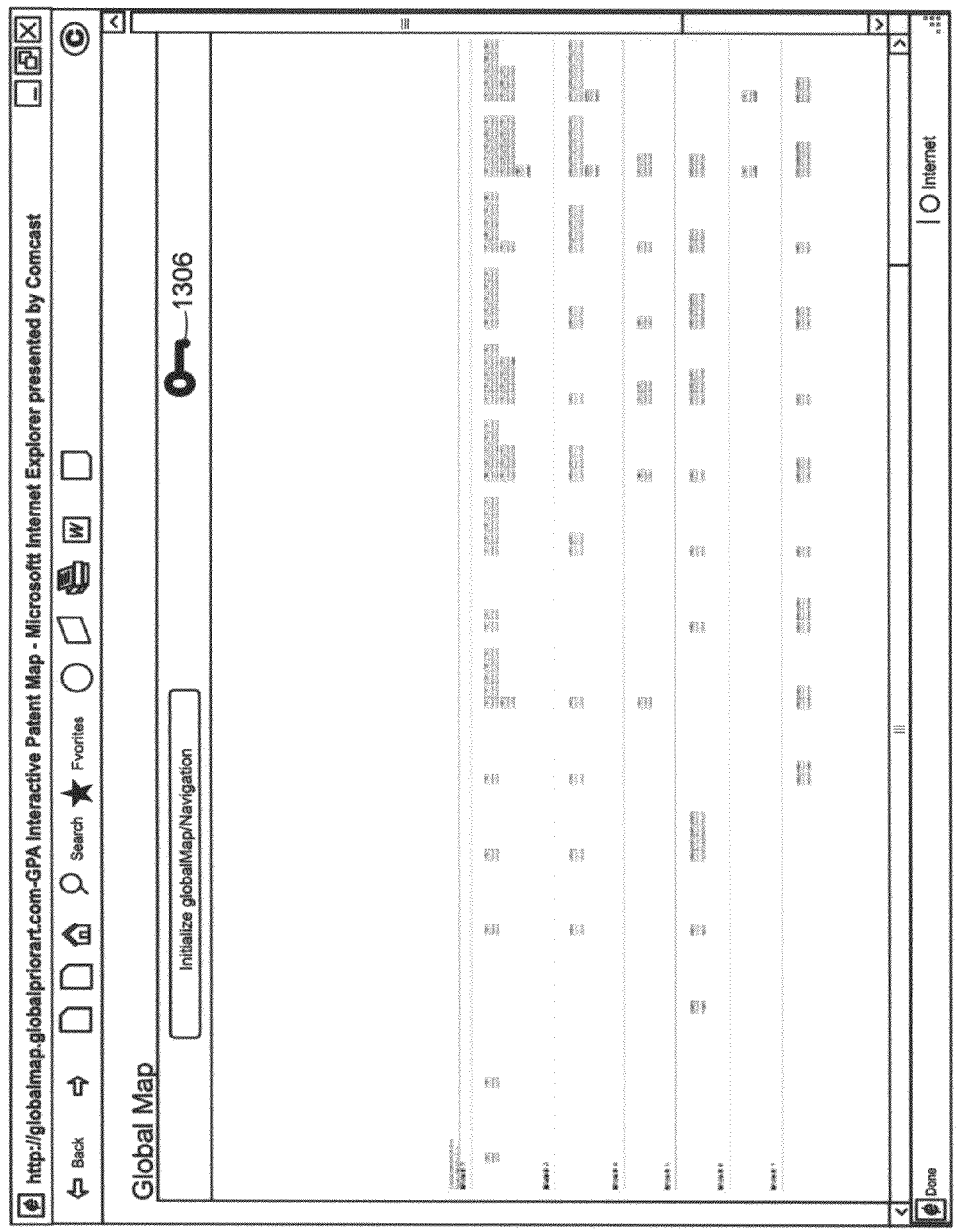
FIG. 13B illustrates an example of a map navigation viewer.

As depicted by the screen 1200 in FIG. 12, the user can view the generated maps by choosing the map name from the drop down box 1202. Upon clicking on "View Global Map" button 1204, the map is loaded within a new window 1304, as shown in FIG. 13B. This also opens another, smaller window 1300 for easier navigation shown in FIG. 13A. The user can hover the mouse over the desired patents to view the patent information in larger dimension. Hovering the mouse over the key icon 1306 will bring up a legend. The patents are categorized horizontally based on the various branches and filing year. The smaller navigation map 1300 provides a horizontal and a vertical slider 1302 for easy zoom in/out features. By clicking on each patent label on the main patent map, a separate window will be opened to a third party website to display the full patent text or PDF.

Figure 14:
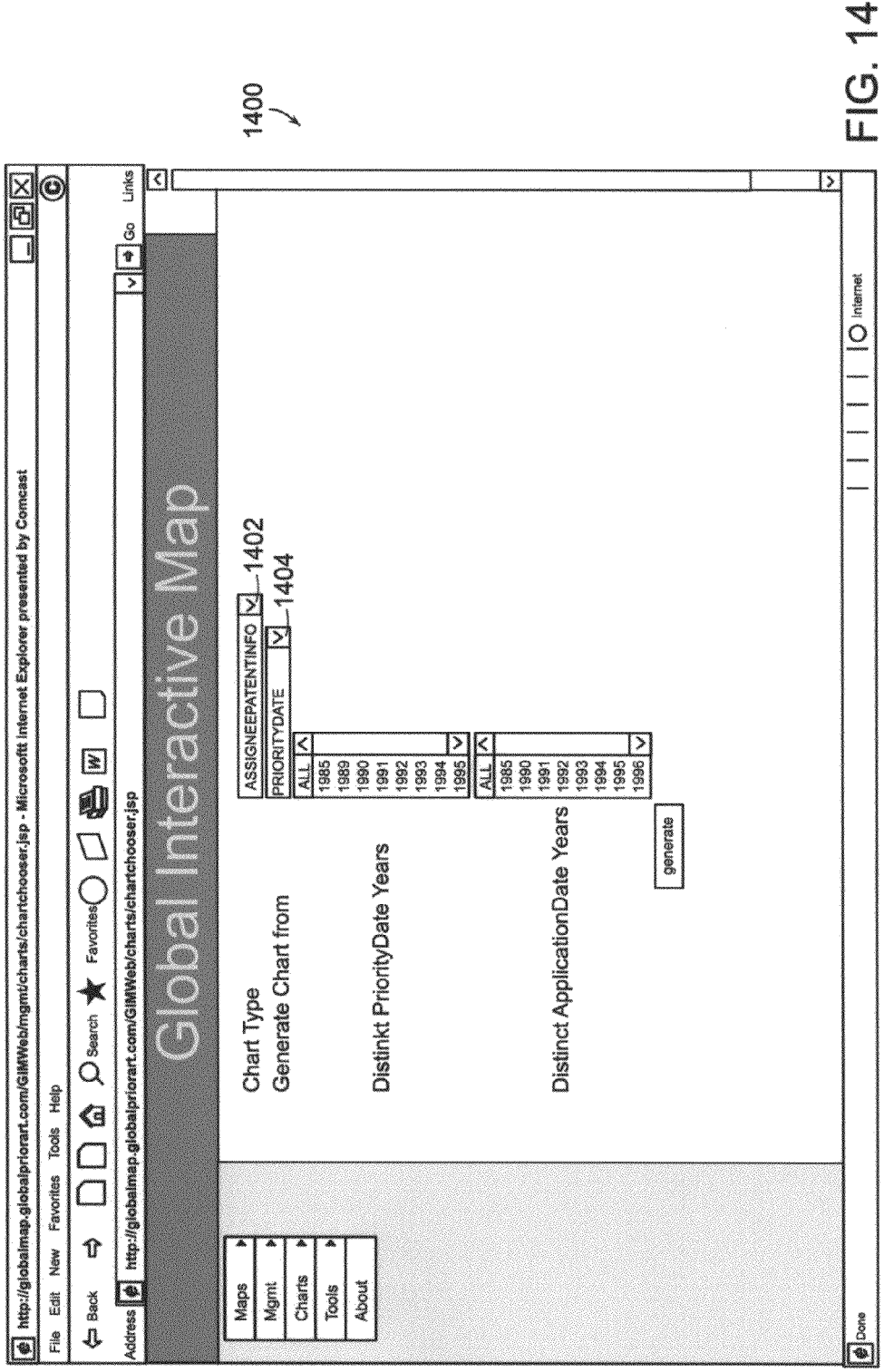
FIG. 14 illustrates an example of a chart generation screen.

The screen 1400 illustrated by FIG. 14 allows generation of bar charts for patent distribution based on assignees or branch 1402. The user selects either ASSIGNEEPATENTINFO or BRANCHPATENTINFO from the form menu 1402, then either Priority Date or Application Date 1404 from another menu. Patent and application years are both displayed separately, but the values selected are applied based on the selection in the year selection box.

Figure 15:
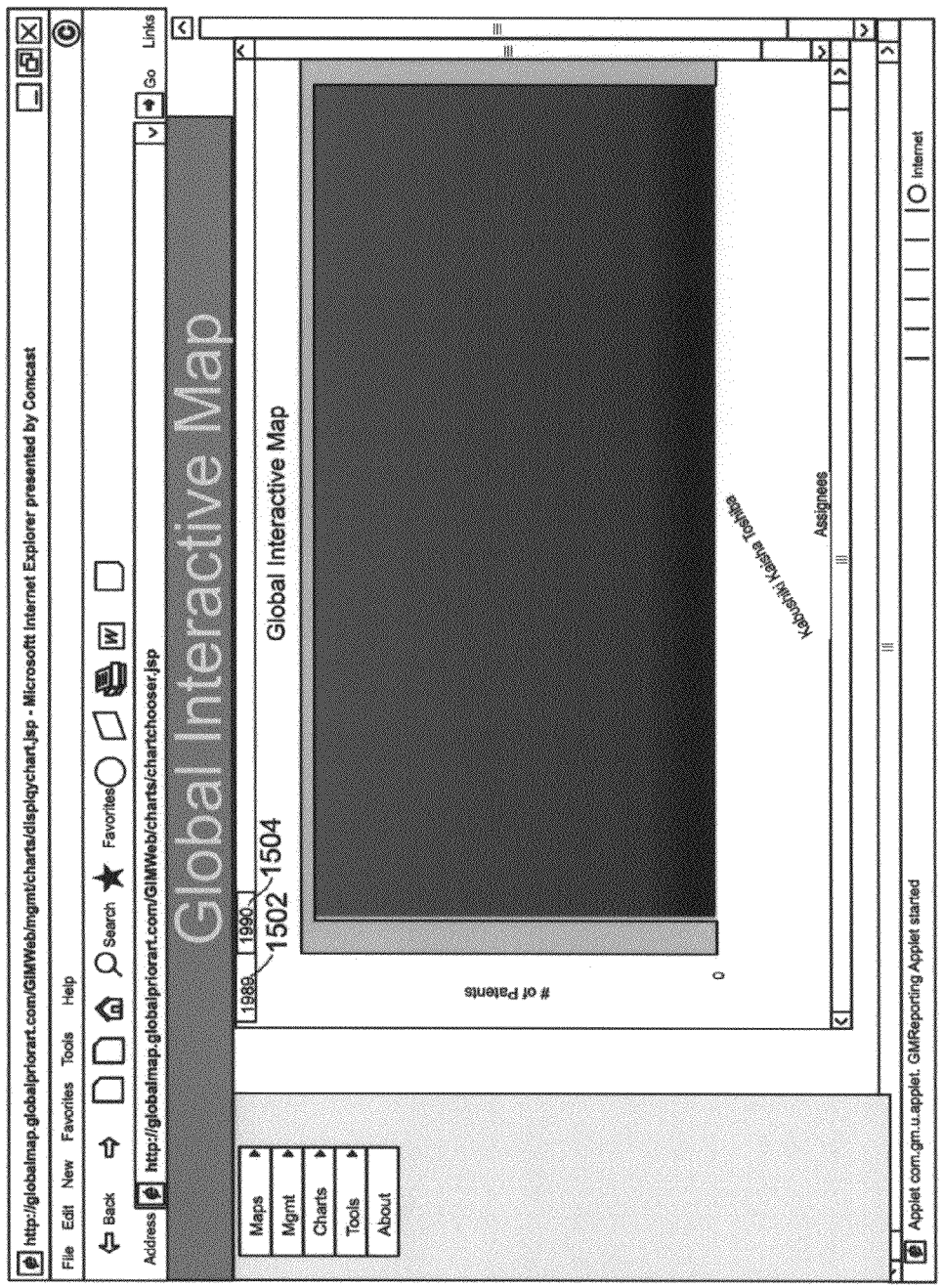
FIG. 15 illustrates an example of a patent chart.

Every patent year/application year 1502, 1504 will have a separate chart within the tabbed display, as shown by FIG. 15. Swing tabbed controls can be used for displaying charts based on patent year/application year.

Figure 16:
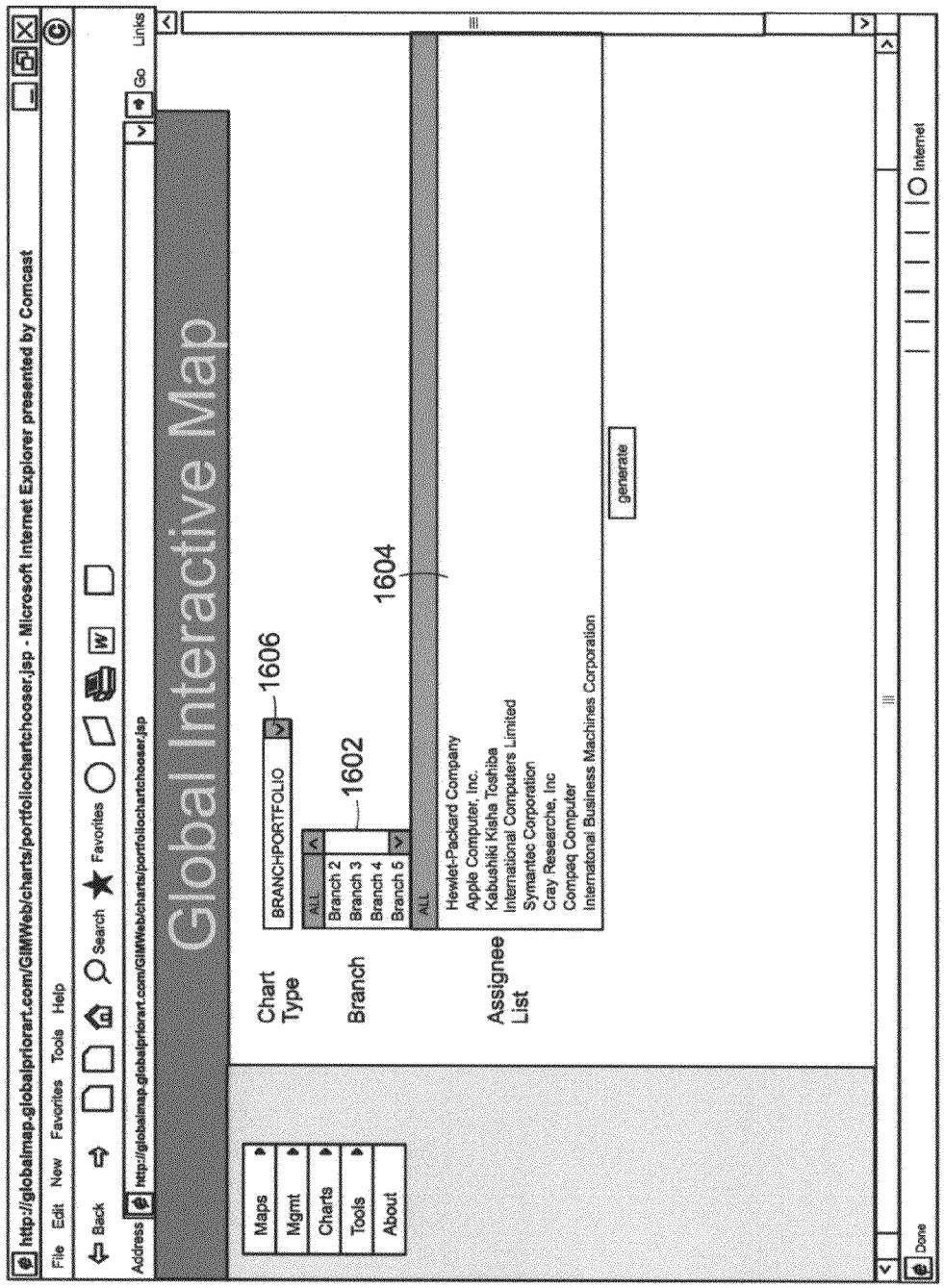
FIG. 16 illustrates an example of a portfolio chart generation screen.

FIG. 16 depicts the screen 1600 that allows for the generation of portfolio charts based on either branch 1602 or assignee information 1604. The user could choose either "BRANCHPORTFOLIO" or "ASSIGNEEPORTFOLIO" from a menu 1606 on the screen. The branch 1602 and assignee information 1604 is applied based on the chart type 1606.

Figure 17:
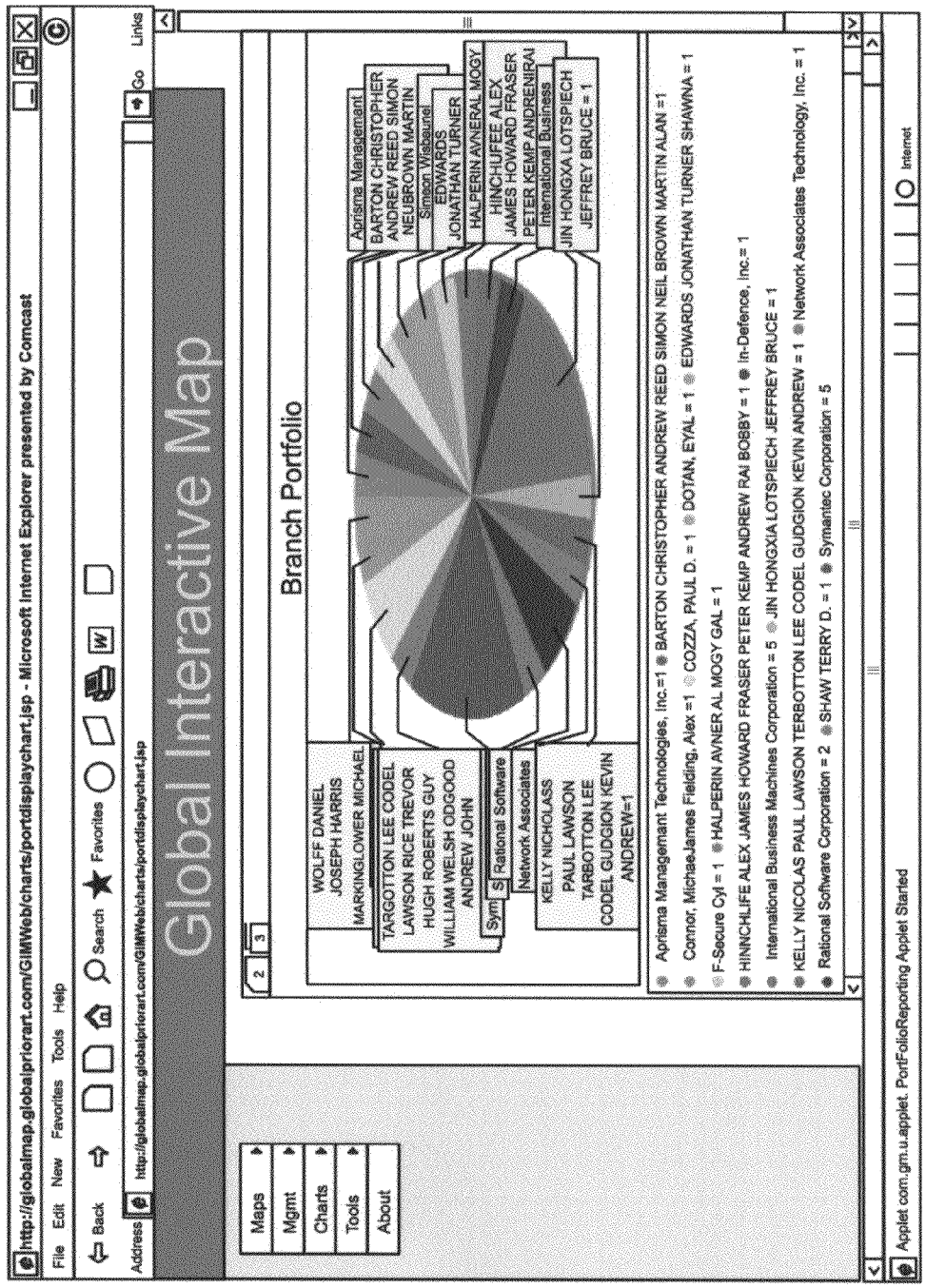
FIG. 17 illustrates an example of a portfolio chart.

Based on the chart type, every branch/assignee will be displayed in a separate tabbed display of the portfolio chart 1700, as shown by FIG. 17. Although a pie chart is shown in FIG. 17, other charts and graphs may be used, such as a heat chart, line graphs, or bar graphs.

Figure 18:
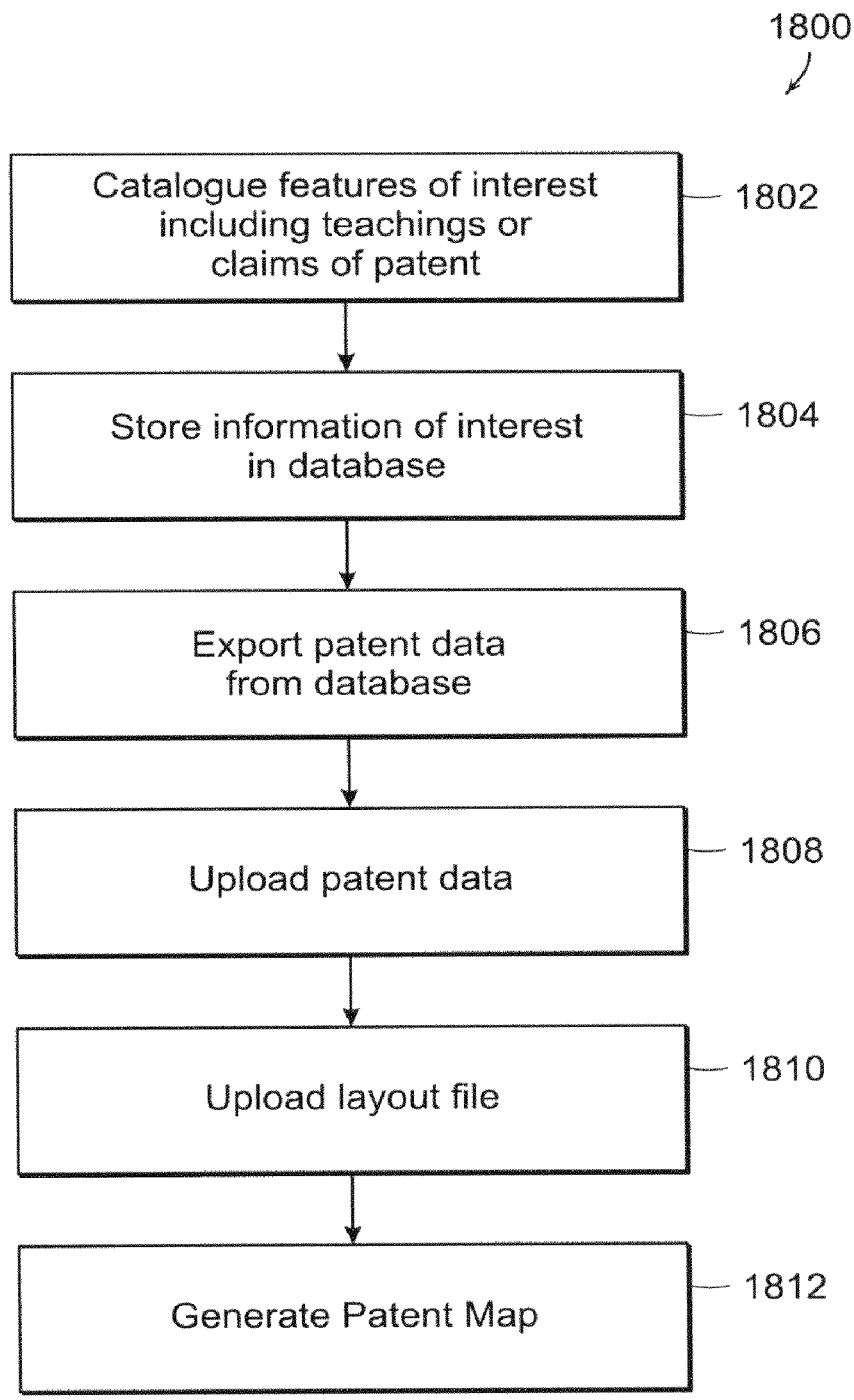
FIG. 18 is a flow diagram illustrating the process for generating a Global Map.

A generalized overview of the process 1800 for generating a Global Map according to an embodiment is described in FIG. 18. At step 1802, a user uses an external, client side database, such as Filemaker Pro, to catalog features of interest (i.e. attributes) in the set of patents being reviewed. The user notes, in the database, whether each attribute is in the teachings or claims of the patent document. The database also stores the bibliographic information of a patent (i.e. inventor, assignee, file date, publication date, number of claims, etc.). The database also tracks which branch (category) a patent is associated. Artificial intelligence or rules based systems may be used to determine and catalogue features of interest in the set of patents being reviewed.

At step 1804, the patent information of interest is stored in the invention database 1906 (further detailed below in FIG. 19). The database 1906 is completed once all the patent information of interest is reviewed and stored. The database 1906 may be using a server-side program, such as MySQL program which serves as the backend to collect and store data which the user uploads, and also stores the Global Maps, account information, etc. Other than the patent number, attribute and branch information, nothing is entered manually because this information can be downloaded and transferred to the database from a number of external sources (e.g. Delphion via an XML export/import).

At step 1806, a file, such as a CSV text file, is exported from the database. The CSV text file contains the necessary fields (patent number, inventor, assignee, dates, attribute info, branch info, etc.).

At step 1808, the data file (from the export from step 1806) is uploaded into the database. The upload process at 1808 can be implemented using Apache commons file upload libraries, and the import functionality can be implemented using the Apache OpenCSV module.

At step 1810, the user uploads a layout file, which is a text file where each row represents each "column" of the exported data file. The layout file helps the system map the data records into the proper fields.

At step 1812, the system generates the global map.

System Architecture

Preferably, the invention is implemented in a software or hardware environment. One such environment is shown in FIG. 19. In this example, a system 1900 is provided for generating an interactive Global Map 100. The system includes an application server 1902, a computer network 1904, client systems 1908 for displaying the Global Map 100, and a database 1906, such as a MySQL application database.

Figure 20:
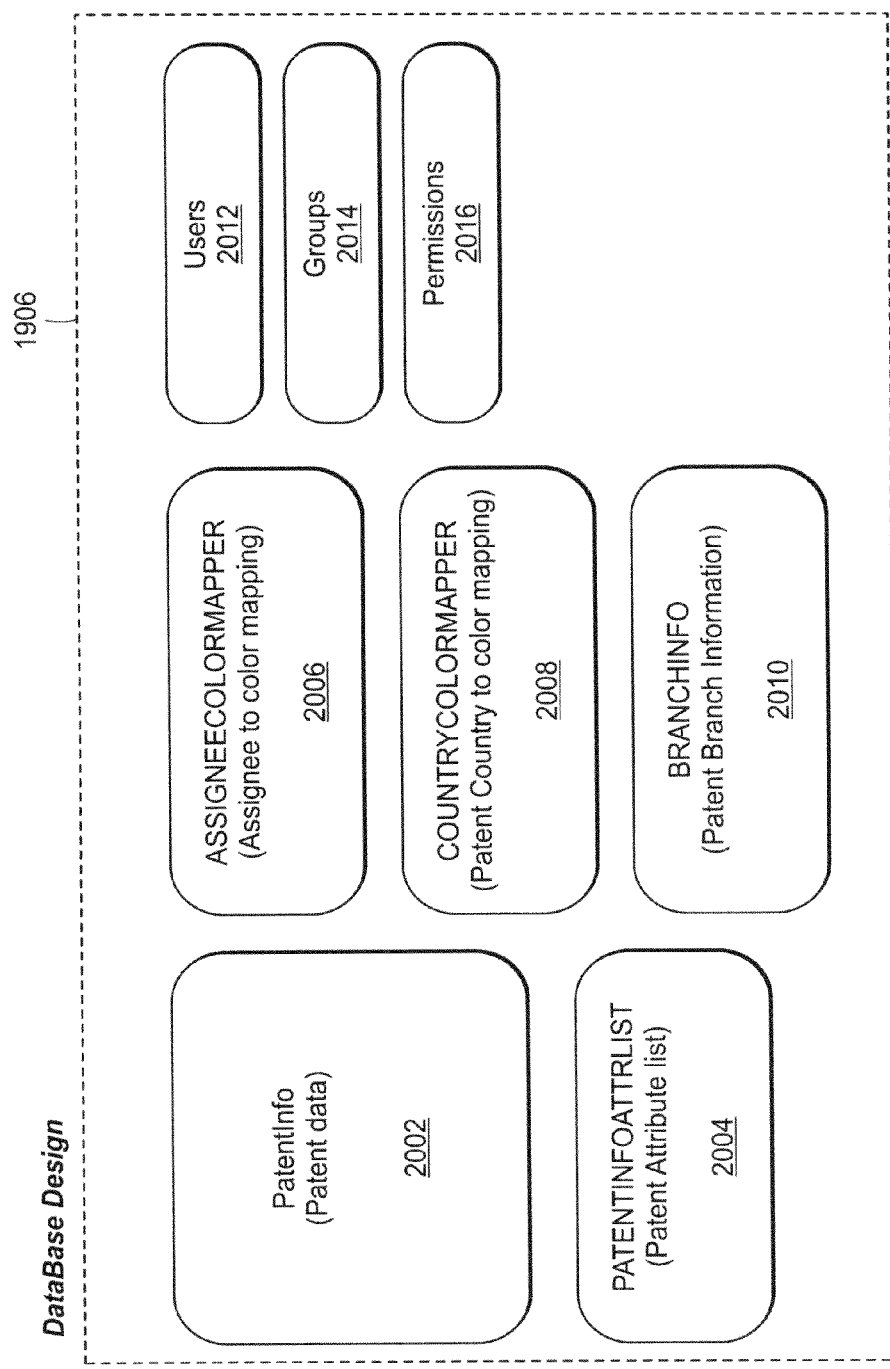
FIG. 20 is a block diagram illustrating the database design.

FIG. 20 illustrates the database 1906 design. The database 1906 contains all of the patent information ("Patentinfo") 2002 and additional static data for map or chart generation. "Static data" includes the following: patent branch information ("BRANCHINFO") 2010, patent attribute list ("PATENTINFOATTRLIST") 2004, assignee to color mapping ("ASSIGNEECOLORMAPPER") 2006, and patent country to color map ("COUNTRYCOLORMAPPER") 1008. The user 2012 uses the database 1906 to catalog the features of interest in the set of patents being reviewed.

The User 2012, Groups 2014, and Permissions 2016 components enable administrators to add/maintain login accounts and access to the system 1900. The admin would be able to create/delete/modify accounts as well as give each account permissions such as "full access, read-only access, map generation access, etc."

Figure 21A:
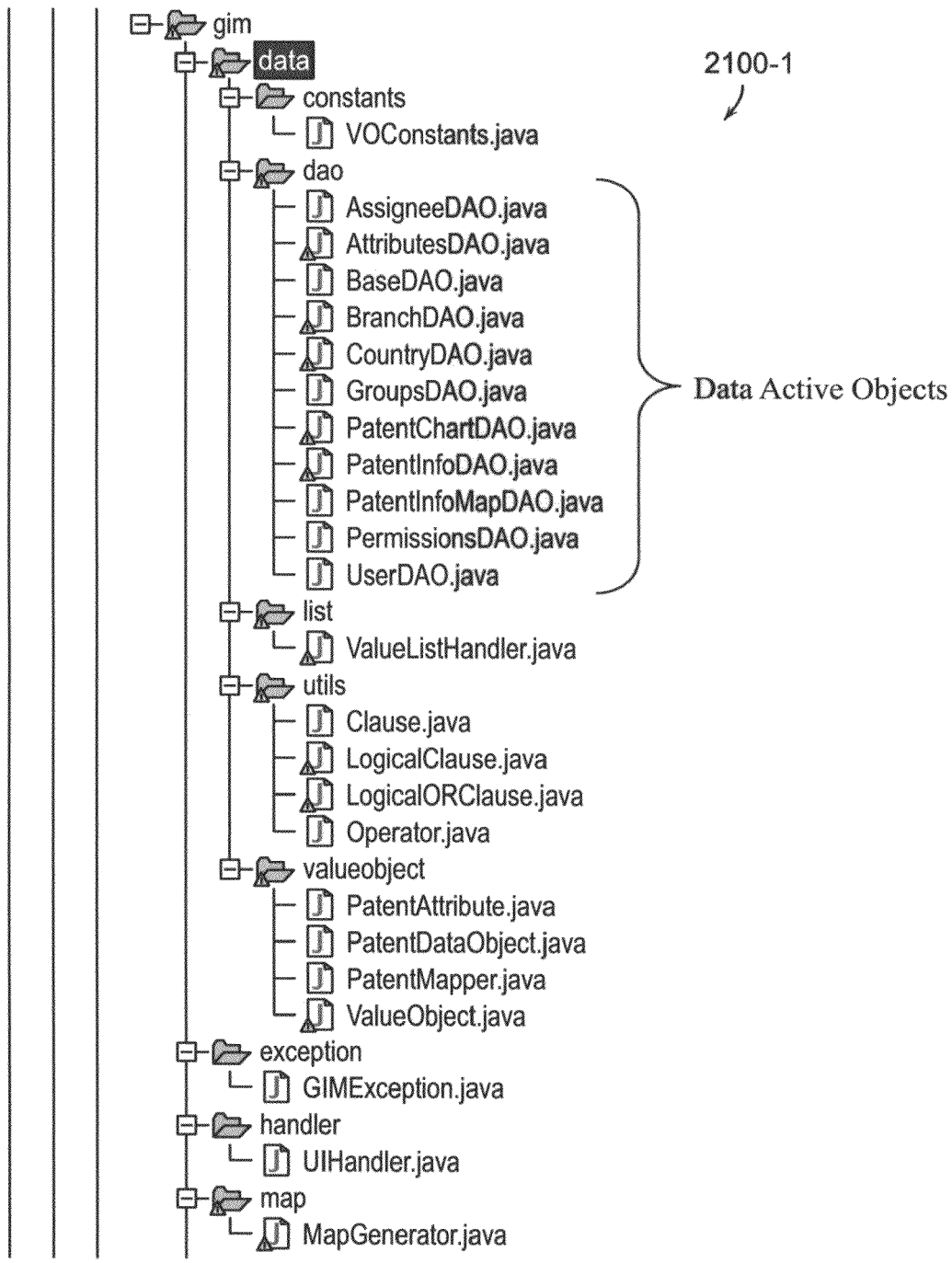
FIGS. 21A and 21B illustrate an example of the software package file contents for map generation and static data maintenance.
Figure 21B:
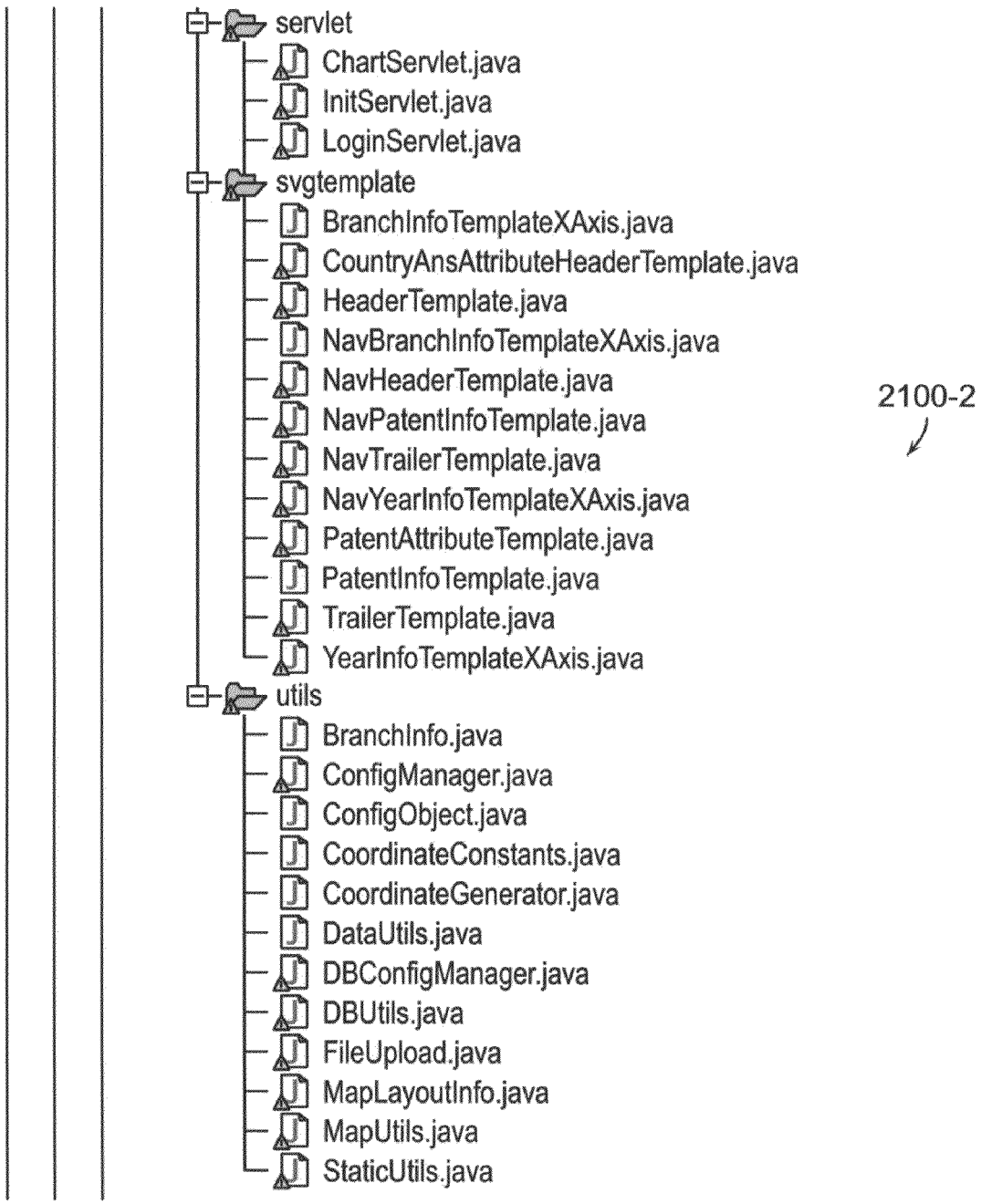

Each table data stored (e.g. branch 2010, attribute 2004, assignee 2006, country color mappings 2008) has a corresponding Data Access Object (DAO). The DAOs provide a common interface between the application layer and the database 1906. FIGS. 21A and 21B show an example of the software package 2100-1, 2100-2 file structure for map generation and static data maintenance including the DAOs.

Figure 19:
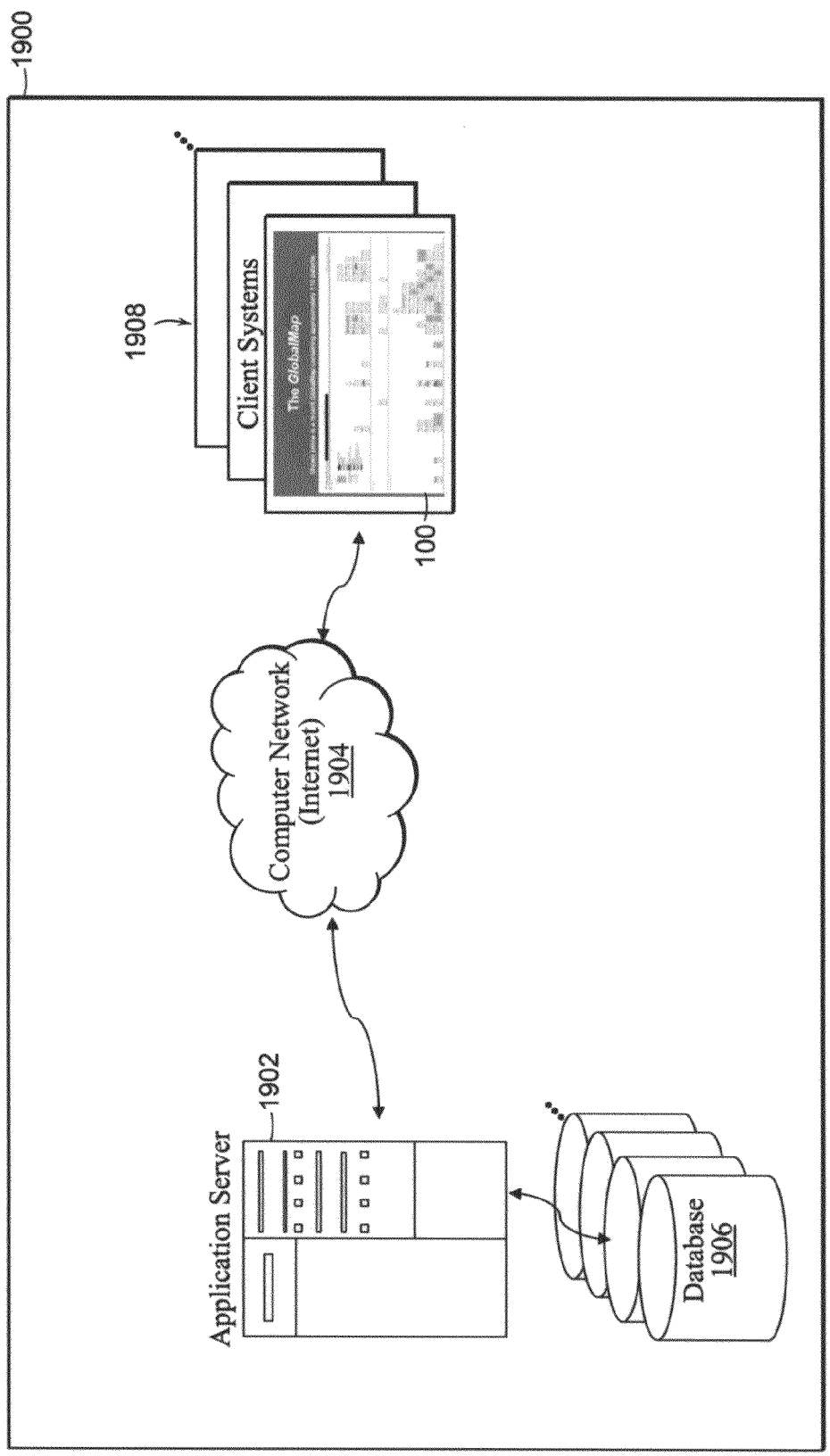
FIG. 19 is a diagram illustrating the computer architecture according to an embodiment of the invention.
Figure 21C:
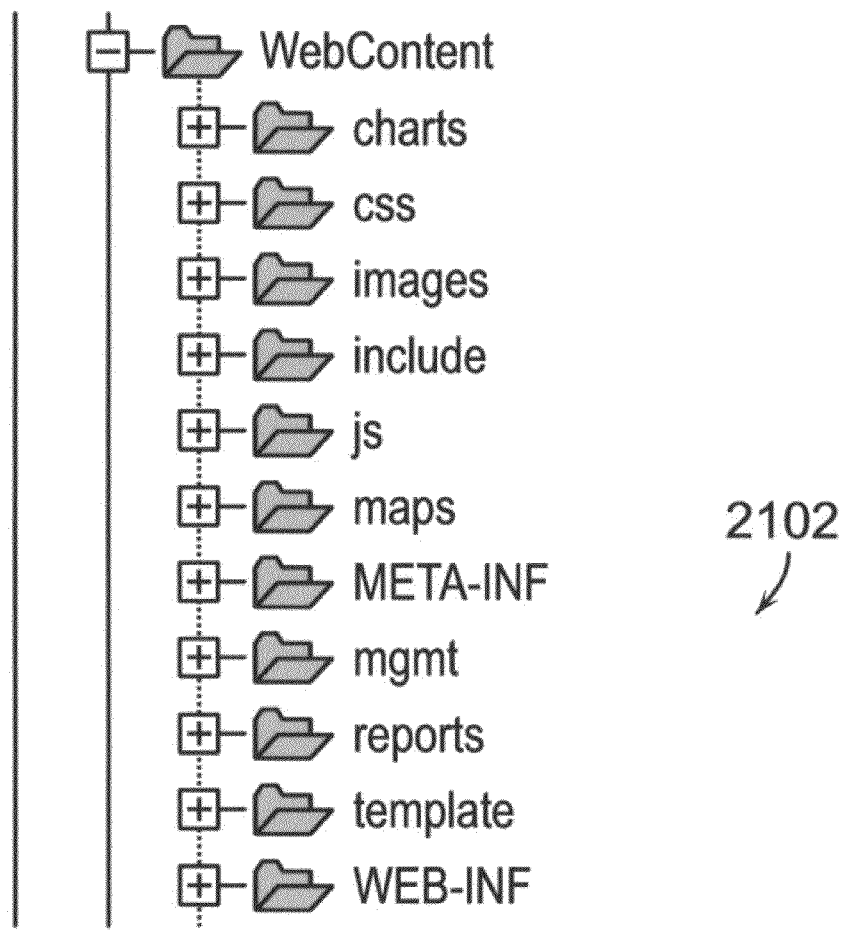
FIG. 21C is an example of the software package file contents for the web application structure.

Referring to FIG. 19, using the application server 1902, a web-based Internet application can be created that allows users to generate the interactive global map 100 and charts 1700 based on various patent criteria. The application is hosted within the application server 1902, which delivers the content to the web 1904. The application could be accessible through an Internet Explorer browser (6.0+) and may be used in conjunction with Adobe SVG plug-in and Java plug-in for viewing generated maps 100 and charts 1700. SVG map actions are implemented using SVG JavaScript extensions. Portions of the Global map, such as the SVG graphic, can be exported by the user for reuse. The plug-ins are installed automatically when the user tries to view the map or chart for the first time. FIG. 21C shows an example of the software package 2104 file contents for the web application structure used in connection with viewing and generating the patent maps 100 and charts 1700.

The user can download the Global Maps 100 (that have been generated through the web interface) onto a CD/DVD.

This feature enables users to view the maps offline. The download allows the user to download the SVG files. In addition, any HTML and JSP files (and SVG viewer plug-in, in case the user needs it) may also be downloaded so that the user can burn the batch to a CD/DVD for complete offline viewing. Any associated patents or technical documents that are identified on the Global Maps 100 are downloaded in PDF format onto a specific directory on the CD/DVD.

Referring back to FIGS. 19 and 20, the static data (branch 2010, attribute 2004, assignee 2006, country color mappings 2008) are saved within the application server's 1902 cache for faster processing. The application server 1902 can be a Tomcat Application server.

Figure 22:
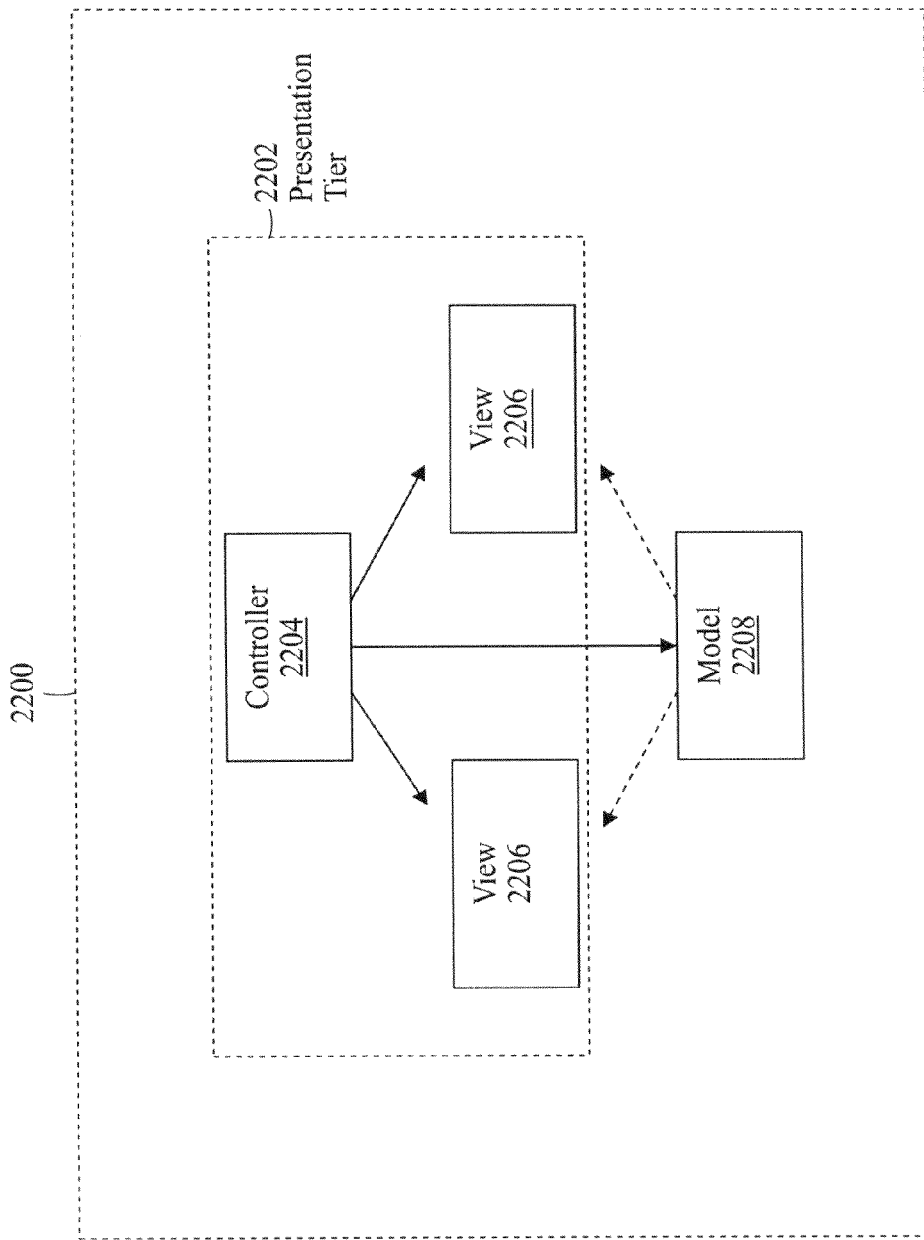
FIG. 22 is a block diagram illustrating an example implementation of the presentation layer architecture according to the Model, View, Control (MVC) paradigm.

The presentation layer is responsible for the delivery and formatting of information to the application layer. The presentation layer is developed using Java Server Pages (JSPs). In map and chart generation, the presentation layer pulls the static data (branch 2010, attribute 2004, assignee 2006, country color mappings 2008) from the application server 1902 cache before making a database 1906 request. In an example implementation, the presentation layer architecture is split up into three layers according to the Model, View, Control (MVC) paradigm, as shown in FIG. 22. The modules from the presentation layer 2102 are loosely coupled using the MVC design pattern. In this way, user input logic and map presentation data are separated from data access and business logic. The model code 2208 handles data and logic. The model code 2208 accesses and represents map data, and handles business operations. The view 2206 handles map output. The view code 2206 displays the global map 100 and charts 1700 to the user. The controller 2204 handles input. The controller code 2204 manipulates the model 2108 or changes the view 2206 accordingly in response to user input (the controller 2204 can also do both).

The model 2208, view 2206, and controller 2204 parts have specific relationships to one another. The view 2206 accesses the model 2206 to retrieve map and chart data for display. The controller 2204 receives user input and makes method invocations on the model 2208. The controller 2204 updates the view 2206, or selects a new view 2206, based on the state of the model 2208 and on its own navigation rules. The model 2208 provides map and chart data to the view 2206, but knows nothing about how the map and chart data is presented. The model 2208 also provides business services to the controller 2204, but knows nothing about user events the controller 2204 has received.

Figure 23:
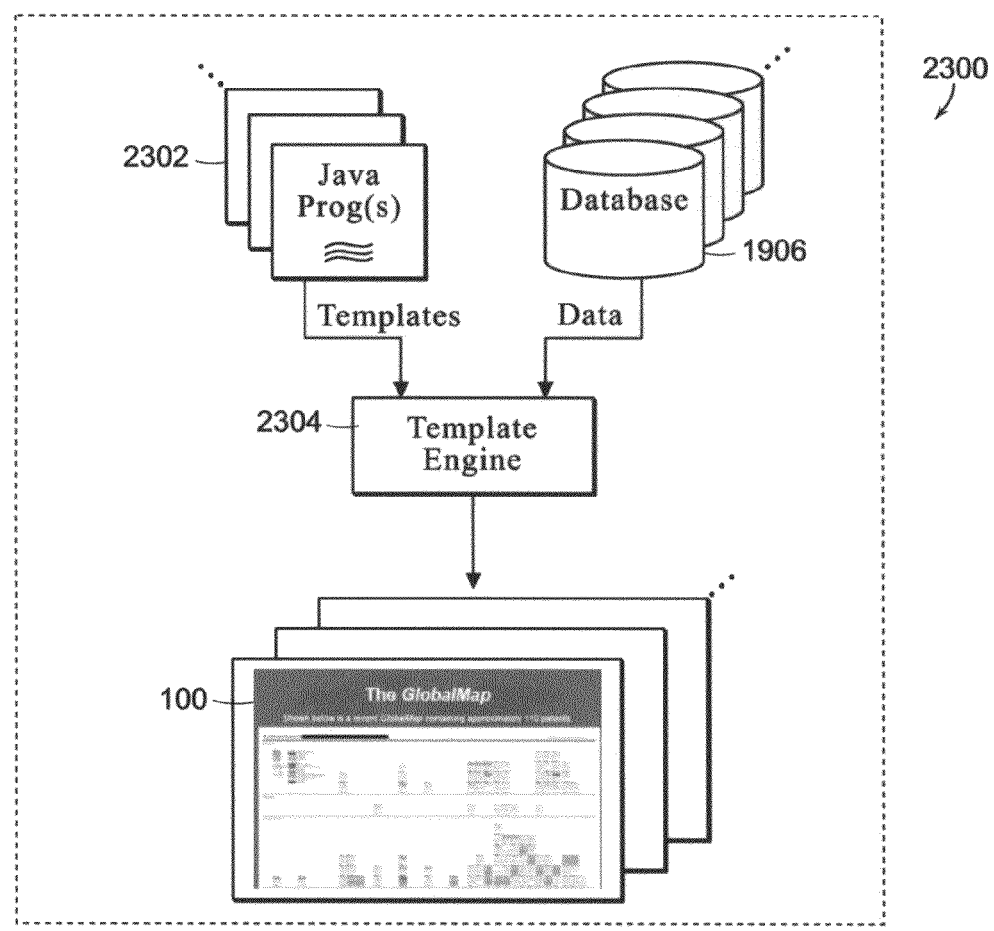
FIG. 23 is a diagram illustrating the basic elements and processing flow using a template engine.

Apache velocity templates can be used for generating the patent maps 100. FIG. 23 is a diagram illustrating the basic elements and processing flow using a template engine 2304. By using the velocity Java-based template engine 2304, the Java code 2302 can be separated from the webpages, making the website more maintainable over its lifespan. The map is split into multiple templates with substitution parameters for coordinates and other display information. The substitution variables are replaced during runtime. Using the templates facilitates the development of maps 100 according to a true MVC model. FIG. 21D shows an example of the file structure for the map templates software package 2104 file structure including VIM template scripts.

Figure 21E:
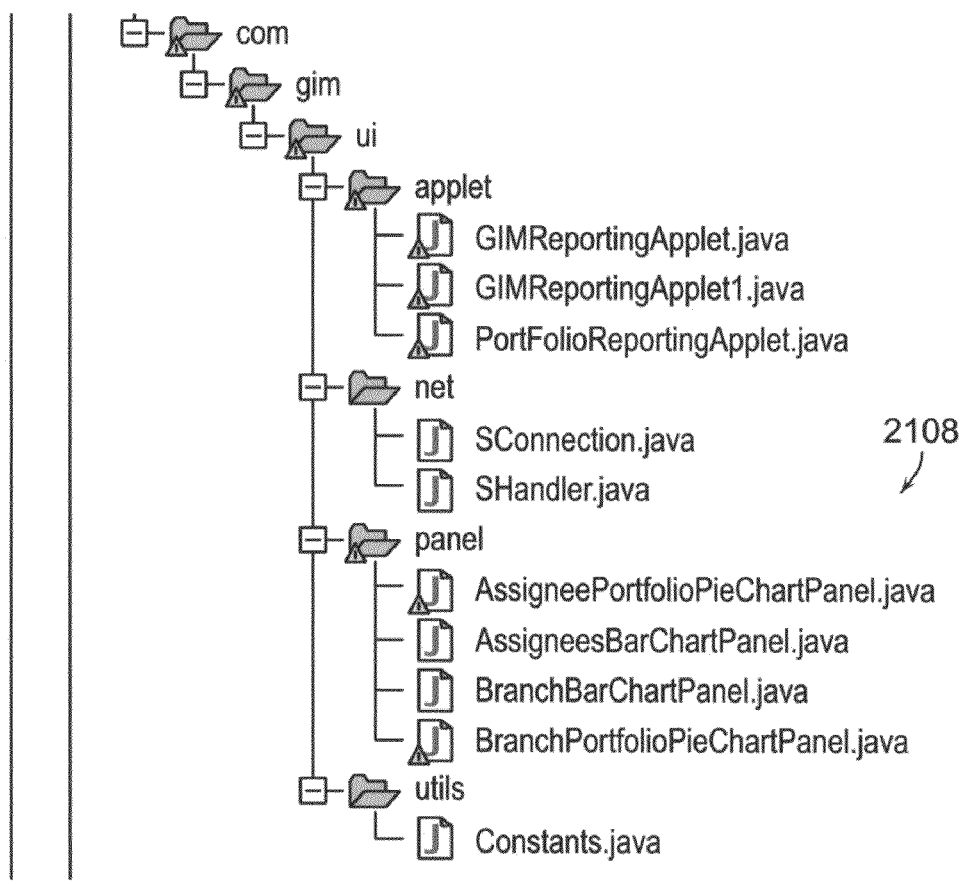
FIG. 21E shows an example user interface chart software package file structure.

The patent charts are implemented using JFree reports. FIG. 21E shows an example user interface chart software package file structure 2108.

Processing Environment

Figure 24:
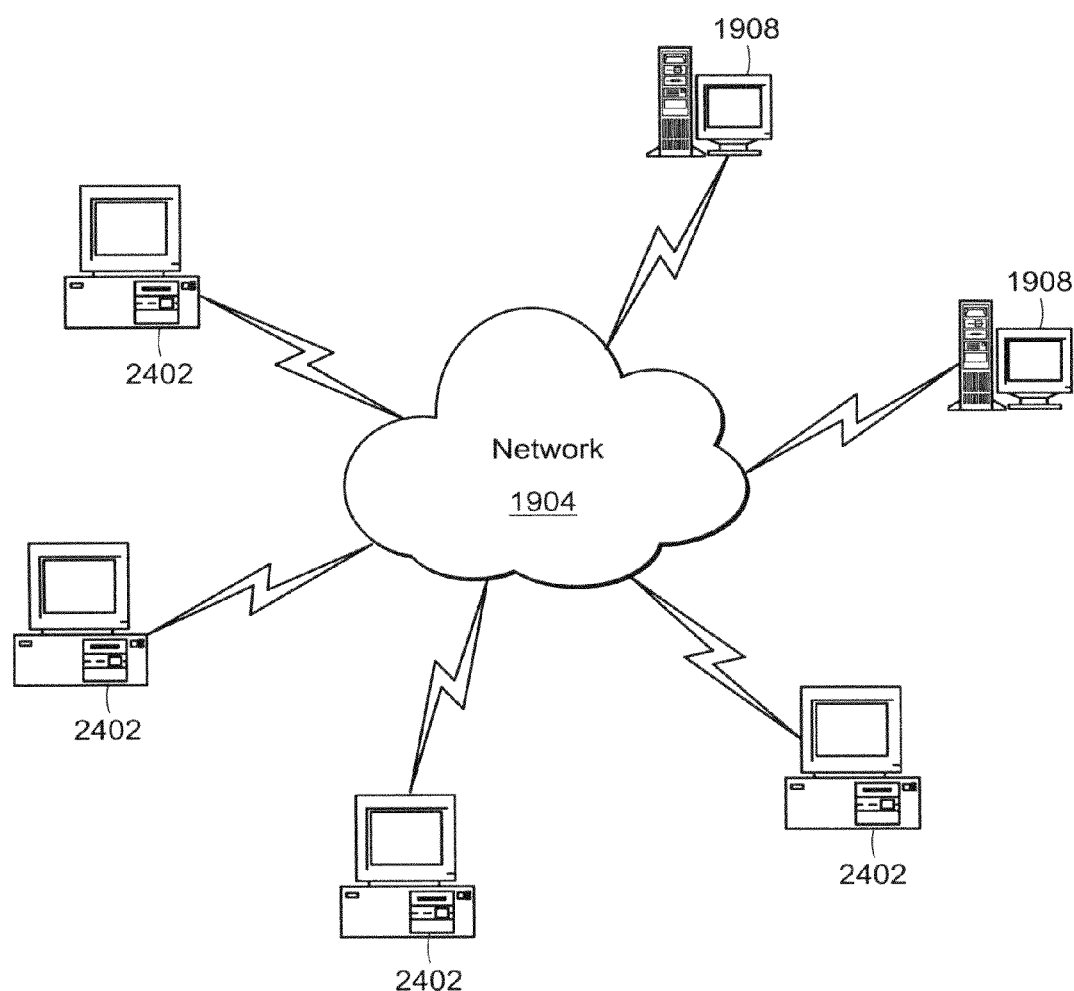
FIG. 24 illustrates a computer network or similar digital processing environment in which the present invention may be implemented.

FIG. 24 illustrates a computer network or similar digital processing environment in which the present invention may be implemented. Client computer(s)/devices 1908 and server computer(s) 1902 provide processing, storage, and input/output devices executing application programs and the like. Client computer(s)/devices 1908 can also be linked through communications network 1904 to other computing devices, including other client devices/processes 1908 and server computer(s) 1902. Communications network 1904 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 25:
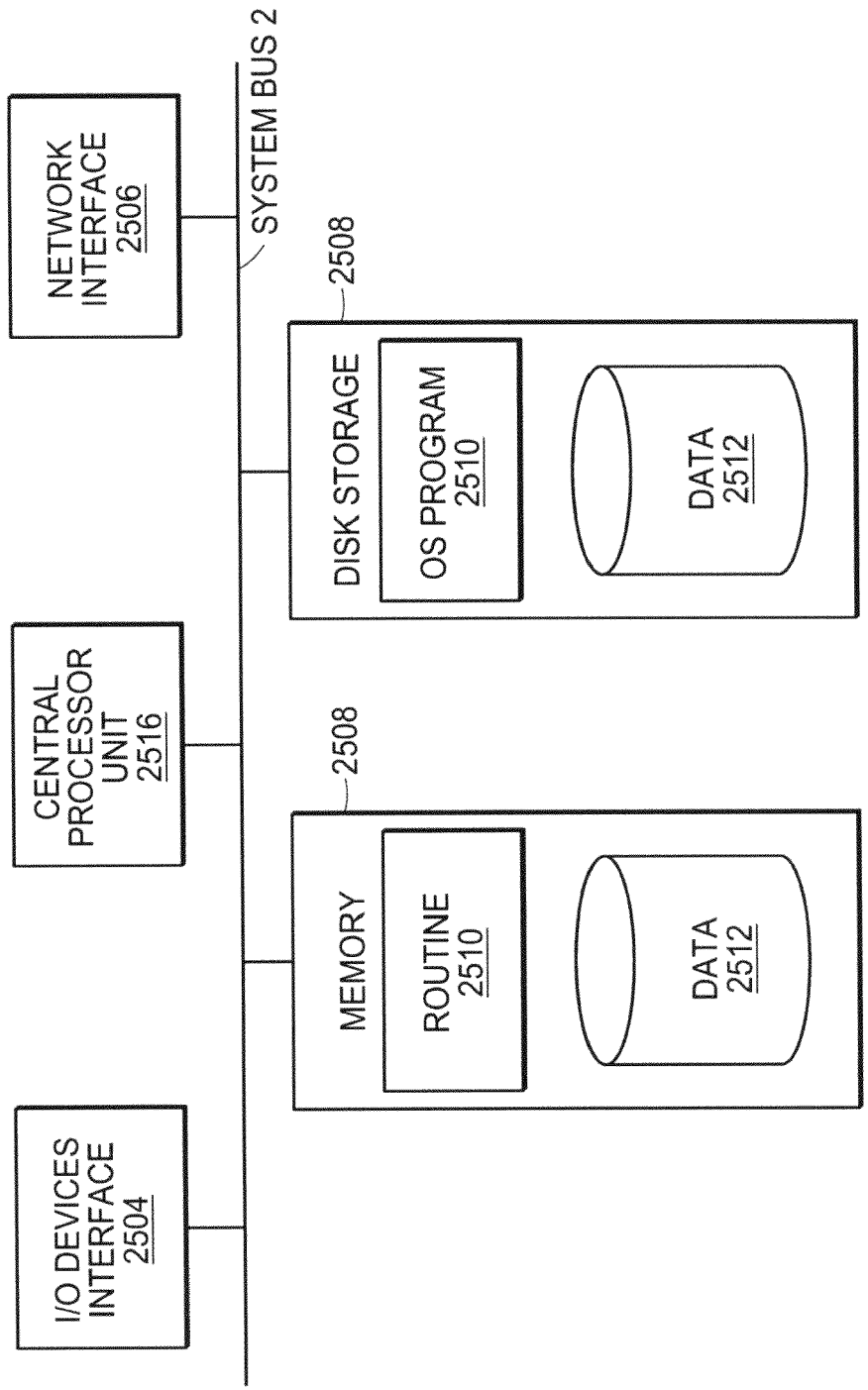
FIG. 25 is a diagram of the internal structure of a computer in the computer system of FIG. 24.

FIG. 25 is a diagram of the internal structure of a computer (e.g., client processor/device 1908 or server computers 1902) in the computer system of FIG. 24. Each computer 1902, 1908 contains system bus 2502, where a bus is a set of hardware lines used for data transfer among the components of a computer or processing system. Bus 2502 is essentially a shared conduit that connects different elements of a computer system (e.g., processor, disk storage, memory, input/output ports, network ports, etc.) that enables the transfer of information between the elements. Attached to system bus 2502 is an Input/Output (I/O) device interface 2504 for connecting various input and output devices (e.g., keyboard, mouse, displays, printers, speakers, etc.) to the computer 1902, 1908. Network interface 2506 allows the computer to connect to various other devices attached to a network (e.g., network 1904 of FIG. 24). Memory 2508 provides volatile storage for computer software instructions 2510 and data 2512 used to implement an embodiment of the present invention (e.g., web based software). Disk storage 2514 provides non-volatile storage for computer software instructions 2510 and data 2512 used to implement an embodiment of the present invention. Central processor unit 2516 is also attached to system bus 2502 and provides for the execution of computer instructions.

In one embodiment, the processor routines 2510 and data 2512 are a computer program product (generally referenced 2510), including a computer readable medium (e.g., a removable storage medium, such as one or more DVD-ROM's, CD-ROM's, diskettes, tapes, etc.) that provides at least a portion of the software instructions for the invention system. Computer program product 2510 can be installed by any suitable software installation procedure, as is well known in the art. In another embodiment, at least a portion of the software instructions may also be downloaded over a cable, communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network, such as the Internet, or other network(s)). Such carrier medium or signals provide at least a portion of the software instructions for the present invention routines/program 2510.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 2510 is a propagation medium that the computer system 1908 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 2510 is a propagation medium that the computer system 1908 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 19, 24 and 25 are for purposes of illustration and not limitation of the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code are retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A computer implemented method for analyzing prior art documents relevant to a specified technology of interest, the prior art documents resulting from a prior art search including patents, patent applications, or non-patent technical literature, the method comprising the steps of:

searching for prior art documents relevant to said specified technology of interest;

processing technological features of interest from the prior art documents resulting from the prior art search, the technological features of interest including technology, manufacturing, or product features associated with one or more of the respective prior art documents, the technological features of interest being determined using a computerized content analysis without needing a citation analysis, where one or more of the technological features of interest are being derived from key features disclosed in a claims section of at least one of the prior art documents;

processing dates of interest from the prior art documents, the dates of interest including dates associated with respective ones of the prior art documents; and creating an interactive map that reflects the technological features of interest from the prior art documents by distributing visual indicators representing at least a portion of the prior art documents on the interactive map along a first axis of the interactive map based on one or more of the respective technological features of a respective prior art document and along a second axis of the interactive map based on a respective date of interest of the respective prior art document;

wherein creating an interactive map that reflects the technological features of interest and dates of at least a portion of the prior art documents further includes:

defining a color schema for each country associated with prior art documents; and using the color schema, creating a chart comparing the prior art documents per country such that the prior art documents associated with a country are clustered by color;

enabling a user to navigate the interactive map; and in response to a user hovering a mouse over a prior art document visual indicator represented on the map, displaying bibliographic information about that prior art document.

2. A computer implemented method for analyzing prior art as in claim 1 wherein distributing the visual indicators along the first axis and second axis of the interactive map further includes:

arranging the visual indicators based on the technological features according to the y-axis on the interactive map; and arranging the visual indicators based on the dates according to the x-axis on the interactive map.

3. A computer implemented method for analyzing prior art as in claim 1 wherein the dates associated with the prior art documents include any of the following: a patent application filing date, a patent application publication date, a patent application priority date, and a document publication date.

4. A computer implemented method for analyzing prior art as in claim 1 wherein the bibliographic information includes any of the following: patent number, priority date, priority country, application date, publication date, title, assignee, inventor, figure/abstract, and defined attributes.

5. A computer implemented method for analyzing prior art as in claim 1 wherein the technological features of interest include any taught technical attributes associated with a prior art document.

6. A computer implemented method for analyzing prior art as in claim 1 wherein the interactive map provides a visual representation of the prior art landscape for use in connection with a due diligence investigation, infringement study, patentability search, or freedom-to-operate study.

7. A computer implemented method for analyzing prior art as in claim 1 wherein at least a portion of the interactive map is an SVG graphic.

8. A computer implemented method for analyzing prior art as in claim 1 wherein the interactive map is generated from a layout file and a file CSV file.

9. A computer implemented method for analyzing prior art as in claim 1 wherein the technological features of interest and dates from a collection of prior art documents are determined using an artificial intelligence based system or a rules based system.

10. A computer implemented method for analyzing prior art as in claim 1 wherein the technological features of interest from the collection of prior art documents are determined using a content based analysis.

11. A data processing system for analyzing prior art documents relevant to a specified technology of interest, the prior art documents resulting from a prior art search including patents, patent applications, or non-patent technical literature, the system including a non-transitory computer readable medium having computer readable instructions, wherein the computer readable instructions when executed by one or more processors, cause the one or more processors to process:
  a handler configured to receive the search results, which include the prior art documents relevant to said specified technology of interest, where the respective prior art documents have one or more corresponding technological features of interest relevant to technology, manufacturing, or product features and dates of interest, the technological features of interest being determined using a computerized content analysis without needing a citation analysis, where one or more of the technological features of interest are being derived based on key features disclosed in a claims section of at least one of the prior art documents; and
  an engine, in communication with the handler, the engine configured to generate an interactive map that reflects the prior art technological features of interest and dates by distributing visual indicators representing at least a portion of the prior art documents on the interactive map, where the visual indicators are distributed on the interactive map along a first axis based on their respective prior art technological features and along a second axis based on their respective dates;
  wherein the engine generating an interactive map that reflects the received prior art features of interest further includes:
    a color schema for each country associated with prior art documents; and
    the engine configured to use the color schema to generate a chart comparing the prior art documents per country such that the prior art documents associated with a country are clustered by color;
  a navigation tool configured to enable a user to navigate the interactive map; and
  an event handler configured to respond to a user mouse event hovering over a prior art visual indicator represented on the map, the handler in communication with the navigation tool, causing the navigation tool to display bibliographic information about that prior art document.

12. A data processing system for analyzing prior art as in claim 11 wherein the engine configured to distribute the visual indicators along the first axis and second axis of the interactive map further includes:
  the engine arranging the visual indicators based on the technological features according to the y-axis on the interactive map; and
  the engine arranging the visual indicators based on the dates according to the x-axis on the interactive map.

13. A data processing system for analyzing prior art as in claim 11 wherein the dates associated with the prior art documents include any of the following: a patent application filing date, a patent application publication date, a patent application priority date, and a document publication date.

14. A data processing system for analyzing prior art as in claim 11 wherein the bibliographic information includes any of the following: patent number, priority date, priority country, application date, publication date, title, assignee, inventor, figure/abstract, and defined attributes.

15. A data processing system for analyzing prior art as in claim 11 wherein the technological features include any taught technical attributes associated with a prior art document.

16. A data processing system for analyzing prior art as in claim 11 wherein the interactive map provides a visual representation of the prior art landscape for use in connection with a due diligence investigation, infringement study, patentability search, or freedom-to-operate study.

17. A data processing system for analyzing prior art as in claim 11 wherein at least a portion of the interactive map is an SVG graphic.

18. A data processing system for analyzing prior art as in claim 11 wherein the interactive map is generated from a layout file and a file CSV file.

19. A data processing system for analyzing prior art as in claim 11 wherein the features of interest from a collection of prior art documents are determined using an artificial intelligence based system or a rules based system.

20. A data processing system for analyzing prior art as in claim 11 wherein the presence of features of interest within a collection of prior art documents is determined using a content based analysis.

21. A data processing system configured to facilitate analysis of prior art documents relevant to a specified technology of interest, the prior art documents resulting from a prior art search including patents or patent applications, the data processing system including a non-transitory computer readable medium having computer readable instructions, which when executed by one or more processors, cause the one or more processors to:
  search for prior art documents relevant to said specified technology of interest;

process claimed technological features of interest concerning respective prior art documents resulting from the prior art search, the claimed technological features being derived from key features disclosed in a claims section of a respective prior art document, the technological features of interest being determined using a computerized content analysis without needing a citation analysis;

process dates of interest relevant to the respective prior art documents;

generate an interactive map to facilitate analysis of the respective prior art documents;

populate the interactive map using visual indicators representing at least a portion of the prior art documents on the interactive map, where the visual indicators are distributed on the interactive map along a first axis based on their respective claimed technological features and along a second axis based on their respective dates of interest;

wherein generating an interactive map that reflects the technological features of interest and dates of at least a portion of the prior art documents further includes:

defining a color schema for each country associated with prior art documents; and using the color schema, creating a chart comparing the prior art documents per country such that the prior art documents associated with a country are clustered by color;

enabling a user to navigate the interactive map; and in response to a user hovering a mouse over a prior art document visual indicator represented on the map, displaying bibliographic information about that prior art document.

* * * * *